United States Patent
Yamasaki

(10) Patent No.: US 10,619,062 B2
(45) Date of Patent: Apr. 14, 2020

(54) AQUEOUS INK, INK CARTRIDGE AND INK JET RECORDING METHOD

(71) Applicant: CANON KABUSHIKI KAISHA, Tokyo (JP)

(72) Inventor: Kousuke Yamasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 15/847,702

(22) Filed: Dec. 19, 2017

(65) Prior Publication Data
US 2018/0179404 A1    Jun. 28, 2018

(30) Foreign Application Priority Data

Dec. 27, 2016 (JP) .................. 2016-252826
Sep. 6, 2017 (JP) .................. 2017-171452

(51) Int. Cl.
| | | |
|---|---|---|
| B41J 2/175 | (2006.01) | |
| B41M 5/00 | (2006.01) | |
| C08F 290/06 | (2006.01) | |
| C08K 3/04 | (2006.01) | |
| C08G 18/08 | (2006.01) | |
| C08G 18/10 | (2006.01) | |
| C08G 18/28 | (2006.01) | |
| C08G 18/32 | (2006.01) | |
| C08G 18/34 | (2006.01) | |
| C08G 18/48 | (2006.01) | |
| C08G 18/73 | (2006.01) | |
| C08G 18/75 | (2006.01) | |
| C08G 18/76 | (2006.01) | |
| C09D 11/102 | (2014.01) | |
| C09D 11/30 | (2014.01) | |
| C09D 11/322 | (2014.01) | |
| C09D 11/326 | (2014.01) | |
| C09D 11/38 | (2014.01) | |

(52) U.S. Cl.
CPC ........... *C09D 11/30* (2013.01); *B41J 2/17503* (2013.01); *B41M 5/0041* (2013.01); *C08F 290/067* (2013.01); *C08G 18/0823* (2013.01); *C08G 18/10* (2013.01); *C08G 18/282* (2013.01); *C08G 18/3228* (2013.01); *C08G 18/348* (2013.01); *C08G 18/4825* (2013.01); *C08G 18/4833* (2013.01); *C08G 18/73* (2013.01); *C08G 18/755* (2013.01); *C08G 18/758* (2013.01); *C08G 18/7671* (2013.01); *C09D 11/102* (2013.01); *C09D 11/322* (2013.01); *C09D 11/326* (2013.01); *C09D 11/38* (2013.01); *C08K 3/04* (2013.01)

(58) Field of Classification Search
CPC ............. B41J 2/17503; C08F 290/067; C08G 18/755; C08G 18/4833; C08G 18/348; C08G 18/758; C08G 18/73; C08G 18/7671; C08G 18/3228; C08G 18/4825; C08G 18/0823; C08G 18/10; C08G 18/282; C08K 3/04; C09D 11/30; C09D 11/102; C09D 11/322; C09D 11/326; C09D 11/38; C09D 11/328; B41M 5/0041
See application file for complete search history.

(56) References Cited

U.S. PATENT DOCUMENTS

| | | |
|---|---|---|
| 2002/0032276 A1 | 3/2002 | Kim et al. |
| 2013/0245157 A1 * | 9/2013 | Kuriyama ............... C09D 11/30 523/201 |
| 2015/0159031 A1 * | 6/2015 | Okamura ............ C09D 11/102 347/86 |
| 2016/0215154 A1 | 7/2016 | Kawabe et al. |

FOREIGN PATENT DOCUMENTS

| | | |
|---|---|---|
| EP | 2647674 A1 | 10/2013 |
| JP | 2006283009 A | 10/2006 |
| JP | 2011102335 A | 5/2011 |
| JP | 2012214712 A | 11/2012 |
| JP | 2016138227 A | 8/2016 |

\* cited by examiner

*Primary Examiner* — Patrick D Niland
(74) *Attorney, Agent, or Firm* — Canon U.S.A., Inc. IP Division

(57) ABSTRACT

An aqueous ink for ink jet recording contains a pigment and a urethane resin. The urethane resin includes units respectively derived from a polyisocyanate, a polyol having no acid group, a polyol having acid group and a primary monoalcohol, has an acid value of 20 mgKOH/g or less based on the unit present at a molecular terminal of the urethane resin and derived from the polyol having acid group and a rate (mol %) of the urethane bond formed by the units derived from the polyisocyanate and the primary monoalcohol accounting for the total of the urethane bond and the urea bond in the urethane resin of 5 mol % or more to 20 mol % or less.

19 Claims, 2 Drawing Sheets

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

In recent years, ink jet recording apparatuses and inks for ink jet recording apparatuses are demanded to simultaneously achieve various performances for responding to a wide range of user needs. That is, the apparatuses and the inks are demanded to be capable of recording an image with high color developability without depending on the type of the recording medium and to be capable of recording an image with high glossiness and image clarity on a recording medium such as glossy paper.

Inks containing urethane resins have been investigated (see Japanese Patent Laid-Open Nos. 2006-283009, 2011-102335, 2012-214712 and 2016-138227) for improving the characteristics of an image recorded with a pigment ink on a recording medium, such as glossy paper or plain paper. The inks described in Japanese Patent Laid-Open Nos. 2006-283009, 2011-102335 and 2016-138227 contain urethane resins prepared through a termination reaction with, for example, isobutanol or methanol. The ink described in Japanese Patent Laid-Open No. 2012-214712 contains a urethane resin including a unit having an acid group at a molecular chain terminal.

The present inventor investigated the above-mentioned pigment inks once again. In every ink described in Japanese Patent Laid-Open Nos. 2006-283009, 2011-102335, 2012-214712 and 2016-138227, the glossiness and the image clarity of a recorded image were not simultaneously achieved at high levels. Thus, an ink that can record images excellent in color developability while satisfying glossiness and image clarity has not been found yet.

Accordingly, the present invention provides an aqueous ink capable of recording images excellent in glossiness, image clarity and color developability. The present invention also provides an ink cartridge and an ink jet recording method using the aqueous ink.

SUMMARY OF THE INVENTION

The present invention provides an aqueous ink, for ink jet recording, containing a pigment and a urethane resin. The urethane resin includes units respectively derived from a polyisocyanate, a polyol having no acid group, a polyol having acid group and a primary monoalcohol. The acid value based on the unit present at a molecular terminal of the urethane resin and derived from the polyol having acid group is 20 m KOH/g or less, and the rate (mol %) of the urethane bond formed by the units derived from the polyisocyanate and the primary monoalcohol accounting for the total of the urethane bond and the urea bond in the urethane resin is 5 mol % or more to 20 mol % or less.

Further features of the present invention will become apparent from the following description of exemplary embodiments with reference to the attached drawings.

BRIEF DESCRIPTION OF THE DRAWINGS

FIG. 2A is a perspective view of the main portion of the ink jet recording apparatus, and FIG. 2B is a perspective view of the head cartridge.

DESCRIPTION OF THE EMBODIMENTS

Figure 1:
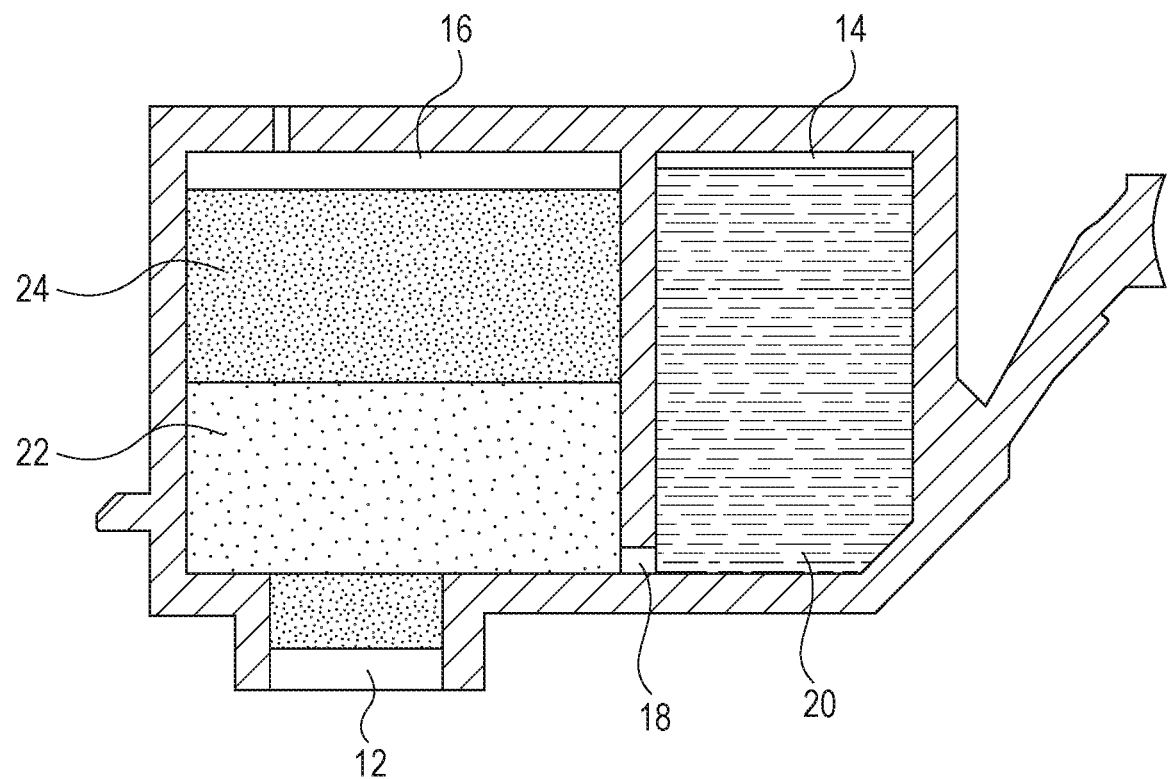
FIG. 1 is a cross-sectional view schematically illustrating an embodiment of the ink cartridge of the present invention.

The present invention will now be described in more detail with reference to embodiments. In the present invention, when a compound is a salt, the salt can be dissociated into an ion and can be present as the ion in an ink, but is expressed as "including a salt" for convenience. An aqueous ink for ink jet recording may be pressed simply as "ink". A physical property value is that at a normal temperature (25° C.) unless otherwise specified.

The urethane resin is a resin synthesized using a (poly) isocyanate in a broad sense. The urethane resin usually used in an aqueous ink for ink jet recording is synthesized using a polyisocyanate and a component (such as polyol or polyamine) reacting with the polyisocyanate and optionally using a crosslinking agent and a chain extender. The urethane resin synthesized using these components is mainly composed of two segments: a hard segment and a soft segment.

The hard segment is constituted of units derived from compounds having relatively small molecular weights, such as a polyisocyanate, a polyamine, a polyol having acid group, a crosslinking agent and a chain extender. The hard segment includes a large number of urethane bonds, and the hard segment portion tends to be present in a dense form due to the hydrogen bonds between the urethane bonds. In contrast, the soft segment is constituted of units derived from compounds having relatively large molecular weights, such as a polyol having no acid group. The soft segment is less likely present in a dense form, compared to the hard segment.

The present inventor investigated images recorded using inks containing pigments and urethane resins. As a result, it was revealed that the addition of a urethane resin into an ink improves the glossiness and image clarity, but decreases the color developability depending on the type of the recording medium. Accordingly, the present inventor investigated the respective mechanisms of expressing glossiness, image clarity and color developability.

Regarding glossiness, it is conceived as follows. The glossiness of an image recorded by a pigment ink is apt to decrease by occurrence of voids in a pigment layer constituting the image. This is caused by that the light incident on the image is scattered in the voids (internal scattering) to reduce the reflection light. The urethane resin is present in an aqueous ink in such a manner that the ether bond or ester bond of the unit derived from a polyol having no acid group is hydrated with a water molecule. The hydrated urethane resin can prevent the pigment from rapidly aggregating in the process of applying the ink to a recording medium and allowing water to evaporate. Consequently, the voids in the pigment layer formed on the recording medium are decreased, and even if voids are generated, the voids are filled with the urethane resin to reduce the internal scattering of light incident on the image, resulting in an improvement in glossiness of the image.

Regarding image clarity, it is conceived as follows. A reaction between a polyisocyanate and a component (such as polyol or polyamine) reacting with the polyisocyanate generates a urethane bond. (—NH—COO—) or a urea bond (—NH—CO—NH—). The imino group (—NH—) present in the urethane bond and the urea bond forms an intermolecular hydrogen bond with the carbonyl group present in another urethane bond or urea bond or the ether bond or ester bond of a polyol having no acid group. Consequently, high interaction is caused among a plurality of urethane resin chains. Accordingly, a composition containing a urethane resin has an increased surface energy. In an image recorded by an ink containing a pigment and a urethane resin on a recording medium, such as glossy paper, the surface energy of each dot is high. Consequently, a plurality of dots wet one another and spread to reduce the difference in level of the dots. Thus, the irregularity on the surface of the pigment layer is reduced, resulting in an improvement in image clarity of the image.

Regarding color developability, it is conceived as follows. As described above, a urethane resin is composed of a hard segment having a large number of urethane bonds and a soft segment constituted of, for example, a polyol having no acid group. Accordingly, the aggregate of the urethane resin has a structure that can be called "block" from the macro viewpoint. When the urethane resin is not specifically designed, the hard segment tends to be highly hydrophobic, and the soft segment tends to be highly hydrophilic. In addition, in this case, the difference in hydrophilicity and hydrophobicity between segments in the molecular chain of a urethane resin varies depending on the position of the hydrophilic group (acid group) in the molecular chain of the urethane resin. In particular, a molecular chain having a large difference in hydrophilicity and hydrophobicity behaves like a surfactant, and the molecular chain has increased permeability. Consequently, the permeability of the urethane resin varies among the molecules such that some molecular chains have high permeability, and other some molecular chains have low permeability. In known inks designed to be capable of improving the glossiness and image clarity by using a urethane resin, the content of the urethane resin is determined so as to include the anticipated amount of the resin permeating into a recording medium. When an image is recorded using such an ink on a recording medium, such as plain paper, the pigment also sinks inside the recording medium together with the urethane resin permeating into the recording medium, which tends to reduce the color developability.

Based on the above-described situation, the present inventor investigated the structure of a urethane resin that hardly permeates into recording media, even if the ink contains the resin in an amount capable of achieving sufficient glossiness and image clarity. In the course of the investigation, it was found that a urethane resin having high permeability includes a "unit derived from a polyol having acid group" at a molecular chain terminal in many cases, and the permeability is increased by the influence of a high acid value based on this unit. The urethane resin has a large difference in hydrophilicity and hydrophobicity between hard and soft segments and tends to increase the permeability with a shift to the hydrophilic side of the balance between hydrophilicity and hydrophobicity. In other words, in order suppress the permeability of a urethane resin, it is necessary to reduce the difference in hydrophilicity and hydrophobicity between segments and to shift the balance to the hydrophobic side.

In order to reduce the difference in hydrophilicity and hydrophobicity between segments, it is necessary to reduce the acid value based on the "unit derived from a polyol having acid group" present at a molecular chain terminal of the urethane resin. Consequently, the deviation in hydrophilicity and hydrophobicity between the inside and the terminal of the molecular chain is reduced, and the difference in hydrophilicity and hydrophobicity between segments is also reduced. In addition, the state of a urethane resin in an aqueous ink is dominantly affected by the unit present at a molecular chain terminal of the urethane resin. For example, if a unit derived from a polyol having acid group is present at a molecular chain terminal, the urethane resin tends to have an affinity to an aqueous medium. Accordingly, the balance between hydrophilicity and hydrophobicity between segments can be shifted to the hydrophobic side by decreasing the "unit derived from a polyol having acid group" present at a terminal of a molecular chain.

The present inventor investigated urethane resins capable of satisfying these conditions and, as a result, found the following two requirements. One is to reduce the acid value based on the "unit derived from a polyol having acid group" present at a molecular terminal of the urethane resin to 20 mgKOH/q or less. A urethane resin satisfying this requirement has a small number of acid groups at the molecular chain terminal, has a reduced difference in hydrophobicity and hydrophilicity of hard and soft segments, and can reduce the permeability. If the acid value is more than 20 mgKOk/g, the permeability is high, and the pigment also sinks, leading to insufficient color developability.

The difference in hydrophilicity and hydrophobicity of a urethane resin can be controlled by designating the acid value based on the unit present at a molecular chain terminal, not the acid value as the urethane resin. The present inventor presumes the reasons thereof as follows. The acid value of a urethane resin contained in an aqueous ink is mainly controlled by the rate of the unit derived from a polyol having acid group. An increase in the acid value as a urethane resin causes the following two phenomena. That is, an increase in the rate of the unit derived from the polyol having acid group increases the affinity of the urethane resin to water and, at the same time, a chain extension reaction by the polyol having acid group occurs to elongate the molecular chain of the urethane resin, leading to a decrease in the affinity of the urethane resin to water. Accordingly, eventually, the acid value as a urethane resin is not a dominant factor in terms of the difference in hydrophilicity and hydrophobicity. Consequently, it is important to control the acid value based on the unit present at a molecular chain terminal.

If the "unit derived from a polyol having acid group" present at a molecular chain terminal is reduced to decrease the acid value based on the unit for reducing the difference in hydrophobicity and hydrophilicity of hard and soft segments, the urethane resin tends to decrease the affinity to water. Consequently, the molecular chain of the urethane resin does not spread in an ink and readily entangles with itself. Therefore, interaction among a plurality of urethane resin chains hardly occurs, leading to insufficient image clarity.

The second requirement is to suppress such a reduction in image clarity. Specifically, the rate (mol %) of the urethane bond formed by the units derived from a polyisocyanate and a primary monoalcohol accounting for the total of the urethane bond and the urea bond in the urethane resin is required to be 5 mol % or more to 20 mol % or less. Introduction of a urethane bond caused by a reaction between polyisocyanate and primary monoalcohol into a terminal of a molecular chain forms an intermolecular hydrogen bond at the terminals of a plurality of urethane resin chains to cause large interaction, resulting in an improvement in the image clarity through the above-described mechanism. Secondary and tertiary monoalcohols have bulky structures, unlike primary monoalcohol, and their steric hindrance prevents urethane resin chains from approaching to each other. Accordingly, the interaction is low, leading to insufficient image clarity. If the rate of the urethane bond is less than 5 mol %, although the interaction occurs, it is insufficient, leading to insufficient image clarity. If the rate is more than 20 mol %, although the image clarity is improved, the interaction is too large. Accordingly, rapid aggregation of the pigment cannot be prevented in the process of applying the ink to a recording medium and allowing water to evaporate, leading to insufficient glossiness.

Ink

Each component constituting an aqueous ink for ink jet recording of the present invention will now be described in detail.

Urethane Resin

As described above, the urethane resin that is generally contained in aqueous inks for ink jet recording is synthesized using at least a polyisocyanate and a component (such as polyol or polyamine) reacting with the polyisocyanate and optionally a crosslinking agent and a chain extender. The urethane resin contained in the ink of the present invention can be synthesized using a polyisocyanate, a polyol having no acid group, a polyol having acid group and a primary monoalcohol. This urethane resin is required to have an acid value of 20 mgKOH/g or less based on the unit present at a molecular terminal and derived from the polyol having acid group. Furthermore, the rate (mol %) of the urethane bond formed by the units derived from the polyisocyanate and the primary monoalcohol accounting for the total of the urethane bond and the urea bond in the urethane resin is required to be 5 mol % or more to 20 mol % or less. In the present invention, the term "unit" regarding a urethane resin refers to a repeating unit of a single monomer. Each monomer being synthesized into a structural unit of a urethane resin will now be described.

In order to efficiently exhibit the effects of the unit derived from specific polyisocyanate in a urethane resin, the urethane resin should not be a urethane resin having an acrylic resin chain (a so-called urethane-acryl composite resin) and also should not be an active energy ray-curable urethane resin, i.e., a urethane resin having a polymerizable group.

Polyisocyanate

The urethane resin contained in the ink of the present invention includes a unit derived from polyisocyanate. The term "polyisocyanate" in the present invention refers to a compound having two or more isocyanate groups in the molecule. Examples of the polyisocyanate include aliphatic and aromatic polyisocyanates. The polyisocyanate can be an aliphatic polyisocyanate, in particular, an aliphatic polyisocyanate having a cyclic structure. The polyisocyanate can be diisocyanate. For example, when polyfunctional polyisocyanate having a structure, such as an allophanate structure, an uretdione structure, an isocyanurate structure or a biuret structure, is used, the amount thereof should be small. Alternatively, such polyisocyanate should not be used.

Examples of the aliphatic polyisocyanate include polyisocyanate having a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane-1,5-diisocyanate and 3-methylpentane-1,5-diisocyanate; and polyisocyanate having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate and 1,3-bis(isocyanatemethyl)cyclohexane.

Examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyl diphenylmethane diisocyanate, tetraalkyl diphenylmethane diisocyanate and $\alpha,\alpha,\alpha',\alpha'$-tetramethylxylylene diisocyanate.

In the urethane resin, the rate (mol %) of the unit derived from the polyisocyanate can be 10.0 mol % or more to 80.0 mol % or less, in particular, 20.0 mol % or more to 60.0 mol % or less.

Polyol and Polyamine

The component forming a unit constituting the urethane resin by the reaction with a polyisocyanate can be a polyol or a polyamine. The term "polyol" in the present invention refers to a compound having two or more hydroxy groups in the molecule, and examples thereof include a polyol having no acid group, such as a polyether polyol, a polyester polyol and a polycarbonate polyol; and a polyol having acid group. The term "polyamine" in the present invention refers to a compound having two or more "amino groups or imino groups" in the molecule. The polyol and the polyamine to be used can be one type or two or more types as needed.

In the urethane resin, the rate (mol %) of the unit derived from the polyol or the polyamine can be 10.0 mol % or more to 80.0 mol % or less, in particular, 20.0 mol % or more to 60.0 mol % or less.

Polyol Having No Acid Group

Examples of the polyether polyol include addition polymers of alkylene oxides and polyols; and glycols, such as poly(alkylene glycol). Examples of the alkylene oxide include ethylene oxide, propylene oxide, butylene oxide and $\alpha$-olefin oxide. Examples of the polyol addition polymerized with alkylene oxide include diols, such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea and its derivatives; and triols, such as glycerin, trimethylolpropane, 1,2,5-hexanetriol, 1,2,6-hexanetriol, pentaerythritol, trimethylolmelamine and its derivatives and polyoxypropylenetriol. Examples of the glycol include poly(alkylene glycol), such as tetramethylene glycol, hexamethylene glycol, ethylene glycol, diethylene glycol, triethylene glycol, tetraethylene glycol, polyethylene glycol, propylene glycol, dipropylene glycol, tripropylene glycol, polypropylene glycol, poly(tetramethylene glycol) and neopentyl glycol; and ethylene glycol-propylene glycol copolymers.

Examples of the polyester polyol include acid esters. Examples of the acid component constituting the acid ester include aromatic dicarboxylic acids, such as phthalic acid, naphthalenedicarboxylic acid, biphenyldicarboxylic acid and tetrahydrophthalic acid; alicyclic dicarboxylic acids, such as hydrogenated products of the above-mentioned aromatic dicarboxylic acids; and aliphatic dicarboxylic acids, such as malonic acid, succinic acid, tartaric acid, oxalic acid, glutaric acid, adipic acid, pimelic acid, subelic acid, azelaic acid, sebacic acid, alkylsuccinic acid, linolenic acid, maleic acid, fumaric acid, mesaconic acid, citraconic acid and itaconic acid. Anhydrides, salts and derivatives (alkyl esters and acid halides) of these acid components can also be used as acid components. Examples of the component forming an ester with an acid component include polyols, such as diol and triol; and glycols, such as poly (alkylene glycol). Examples of the polyols and the glycols include those exemplified as components constituting the polyether polyol.

The polycarbonate polyol can be produced by a known method and is specifically, for example, alkanediol-based polycarbonate diol, such as polyhexamethylene carbonate diol. Alternatively, the polycarbonate polyol can be the polycarbonate diol produced by a reaction of a carbonate component, such as alkylene carbonate, diaryl carbonate or dialkyl carbonate, or phosgene and an aliphatic diol component.

The polyol having no acid group can have a number-average molecular weight of 400 or more to 4,000 or less. The polyol having no acid group can be the polyether polyol, in particular, polypropylene glycol. Since the alkylene oxide moiety in the structure of the polyether polyol is hydrated with a water molecule, the pigment can be prevented from rapidly aggregating in the process of applying the ink to a recording medium and allowing water to evaporate. As a result, voids in the pigment layer are decreased, leading to a further improvement in the glossiness of the image. A urethane resin synthesized using polypropylene glycol as the polyether polyol tends to be present near the pigment particle due to the function of the branched methyl group in the propylene oxide structure. Consequently, aggregation of the pigment can be particularly efficiently prevented, and a state of filling the voids in the pigment layer with the urethane resin can be readily achieved, leading to, particularly, an improvement in glossiness.

In the urethane resin, the rate (mol %) of the unit derived from the polyol having no acid group accounting for the total amount of the units derived from all the polyol can be 5.0 mol % or more to 50.0 mol % or less, in particular, 5.0 mol or more to 40.0 mol % or less.

Polyol Having Acid Group

Examples of the polyol having acid group include polyols having acid groups such as a carboxylic acid group, a sulfonic acid group, a phosphoric acid group and a phosphonic acid group. In particular, the acid group can be carboxylic acid group. Examples of the polyol having carboxylic acid group include dimethylolacetic acid, dimethylolpropionic acid, dimethylolbutanoic acid and dimethylolbutyric acid. Above all, dimethylolpropionic acid and dimethylolbutanoic acid, in particular, dimethylolpropionic acid can be used. The acid group of the polyol having acid group may be in a salt form, and examples of the cation forming the salt include alkali metal ions, such as lithium, sodium and potassium ions; and cations of organic amines, such as ammonium and dimethylamine ions. The molecular weight of a general-purpose polyol having acid group is about 400 at the highest, and the unit derived from the polyol having acid group basically becomes a hard segment of the urethane resin.

In the urethane resin, the rate (mol %) of the unit derived from the polyol having acid group accounting for the total amount of the units derived from all the polyol can be 50.0 mol % or more to 95.0 mol % or less, in particular, 60.0 mol % or more to 90.0 mol % or less.

Polyamine

Examples of the polyamine include monoamine having a plurality of hydroxy groups, such as dimethylolethylamine, diethanolmethylamine, dipropanolethylamine and dibutanolmethylamine; bifunctional polyamine, such as ethylenediamine, propylenediamine, hexylenediamine, isophoronediamine, xylylenediamine, diphenylmethanediamine, hydrogenated diphenylmethanediamine and hydrazine; and tri- or more functional polyamine, such as diethylenetriamine, triethylenetetramine, tetraethylenepentamine, polyamidepolyamine and polyethylenepolyimine. For convenience, compounds having a plurality of hydroxy groups and one "amino group or imino group" are also exemplified as "polyamine". As in the general-purpose polyol having acid group, the molecular weight of a general-purpose polyamine is about 400 at the highest, and the unit derived from polyamine basically becomes a hard segment of the urethane resin.

The rate (mol %) of the unit derived from the polyamine in the urethane resin can be 10.0 mol % or less, in particular, 5.0 mol % or less. The rate may be 0.0 mol %.

Primary Monoalcohol

Primary monoalcohol is used as the component forming a unit constituting the urethane resin by a reaction with the above-described polyisocyanate. The term "primary monoalcohol" in the present invention refers to a compound having a hydroxy group substituted for a hydrogen atom on a primary carbon atom in a hydrocarbon chain. The hydrocarbon chain is specifically a linear or branched chain, in particular, a linear hydrocarbon chain. The hydrocarbon chain can have 1 to 30 carbon atoms, preferably 1 to 12 and more preferably 1 to 6 carbon atoms.

Examples of the primary monoalcohol include linear primary monoalcohol, such as methanol, ethanol, 1-propanol, 1-butanol, 1-pentanol, 1-hexanol, 1-heptanol, 1-octanol, 1-decanol, 1-dodecanol and 1-triacontanol; and branched primary monoalcohol, such as 2-methylpropan-1-ol and 3-methyl-1-butanol. The primary monoalcohol can be particularly methanol, which has small steric hindrance and efficiently exhibits intermolecular interaction at a molecular terminal and thereby can further enhance image clarity.

In the urethane resin, the rate (mol %) of the unit derived from the primary monoalcohol can be 1.0 mol % or more to 80.0 mol % or less, preferably 5.0 mol % or more to 50.0 mol % or less and more preferably 10.0 mol % or more to 30.0 mol % or less.

Crosslinking Agent and Chain Extender

In the synthesis of the urethane resin, a crosslinking agent and a chain extender may be used. Usually, the crosslinking agent is used in synthesis of a prepolymer, and the chain extender is used in a chain extension reaction of the previously synthesized prepolymer. Basically, the crosslinking agent and the chain extender can be appropriately selected from water and, for example, the above-mentioned polyisocyanate, polyol and polyamine depending on the purpose, such as crosslinking and chain extension. The chain extender may be a compound that can crosslink a urethane resin.

Neutralizing Agent

The acid group of the urethane resin can be neutralized with an alkali metal ion and at least one ammonium type ion selected from an ammonium ion and an organic ammonium ion. The neutralization ratio of the acid group can be 80% or more based on the whole acid groups in the urethane resin, and the neutralization ratio by the ammonium type ion can be 1% or more to less than 45%. If the neutralization ratio is less than 80% based on the whole acid groups, the aggregation properties of the urethane resin in an ink is enhanced, and the intermittent ejection stability of the ink may be decreased. The neutralization ratio can be 100% or less of the whole acid groups. If the neutralization ratio by the ammonium type ion is less than 1%, a reduction in pH of the ink due to protons generated by decomposition of the urethane resin cannot be prevented. Consequently, the urethane resin in the ink becomes unstable, and the aggregation properties are enhanced. As a result, the intermittent ejection stability of the ink may be decreased. If the neutralization ratio by the ammonium type ion is 45% or more, the aggregation properties of the urethane resin during evaporation of the ink are enhanced, the intermittent ejection stability may be decreased. The neutralization ratio by the ammonium type ion can be 2% or more to 40% or less.

The neutralization ratio by the alkali metal ion may be determined considering the total neutralization ratio of the acid group and the neutralization ratio by the ammonium type ion and, specifically, can be 45% or more to less than 99%, in particular, 46% or more to 98% or less.

Examples of the alkali metal ion include a lithium ion, a sodium ion and a potassium ion. In order to neutralize the acid group in a urethane resin with an alkali metal ion, a hydroxide of an alkali metal (such as lithium hydroxide, sodium hydroxide and potassium hydroxide) can be used. In such a case, the alkali metal ion generated by ionic dissociation of a hydroxide of an alkali metal neutralizes the acid group in the urethane resin. In particular, the alkali metal ion can be a potassium ion.

Examples of the ammonium type ion include an ammonium ion ($NH_4^+$) and an organic ammonium ion ($NX_4^+$, where X represents a hydrogen atom or an organic group, and at least one of Xs represents an organic group). In order to neutralize the acid group in a urethane resin with an ammonium type ion, a compound represented by Formula (1) or Formula (2) can be used. In such a case, the ammonium type generated by ionization or ionic dissociation of the compound neutralizes the acid group in the urethane resin. The term "mono- to tri-" in the following description means mono, di and tri, and the term "mono- to tetra-" means mono, di, tri and tetra.

$$NR_1R_2R_3 \quad \text{Formula (1):}$$

where, $R_1$, $R_2$ and $R_3$ each independently represent a hydrogen atom, an alkyl group having 1 to 6 carbon atoms or a hydroxyalkyl group having 1 to 6 carbon atoms.

Examples of the compound represented by Formula (1) include ammonia; aliphatic amines, such as mono- to tri-methylamine, mono- to tri-ethlamine, mono- to tri-propylamine, mono- to tri-butylamine, mono- to tri-pentylamine and mono- to tri-hexylamine; and alkanolamines, such as mono- to tri-ethanolamine, mono- to tri-isopropanolamine, dimethylethanolamine and methyldiethanolamine.

The compound represented by Formula (1) is ionized in an ink as follows, and the generated ammonium type ion neutralizes the acid group of a urethane resin.

$$NR_1R_2R_3 + H_2O \rightarrow N^+HR_1R_2R_3 + OH^-$$

$$N^+R_1R_2R_3R_4A^+ \quad \text{Formula (2):}$$

where, $R_1$, $R_2$, $R_3$ and $R_4$ each independently represents a hydrogen atom, an alkyl group having 1 to 6 carbon atoms or a hydroxyalkyl group having 1 to 6 carbon atoms; and $A^+$ represents a monovalent anion.

Examples of the compound represented by Formula (2) include ammonium salts; aliphatic amine salts, such as mono- to tetra-methylamine salts, mono- to tetra-ethylamine salts, mono- to tetra-propylamine salts, mono- to tetra-butylamine salts, mono- to tetra-pentylamine salts and mono- to tetra-hexylamine salts; and alkanolamine salts, such as mono- to tetra-ethanolamine salts and mono- to tetra-isopropanolamine salts. Examples of the monovalent anion ($A^+$) constituting the compound (ammonium salt or amine salt) represented by Formula (2) include a hydroxide ion, a halide ion and a monovalent inorganic acid anion. Examples of the halide ion include a fluorine ion ($F^-$), a chloride ion ($Cl^-$), a bromide ion ($Br^-$) and an iodide ion ($I^-$). Examples of the monovalent inorganic acid anion include a nitrate ion ($NO_3^-$).

The compound represented by Formula (2) is ionically dissociated in an ink as follows, and the generated ammonium type ion neutralizes the acid group of a urethane resin.

$$N^+R_1R_2R_3R_4A^- \rightarrow N^+R_1R_2R_3R_4 + A^-$$

In order to neutralize the acid group of a urethane resin, the ammonium type ion generated by ionization of a compound represented by Formula (1), specifically $N^+H(CH_2CH_2OH)_3$ (cation derived from triethanolamine), can be used. The use of $N^+H(CH_2CH_2OH)_3$ can efficiently prevent the pH of an ink from being decreased by the protons generated by decomposition of the urethane resin and thereby can significantly prevent a decrease in intermittent ejection stability.

The type of an agent for neutralizing the acid group of a urethane resin can be analyzed using the urethane resin isolated from an ink. The isolated urethane resin is diluted with water to prepare a sample, and the sample is subjected to electrophoretic chromatography to separate the neutralizing agent. Subsequently, for example, mass spectrometry and an NMR method are carried out for identification of the type and quantitative measurement of the neutralizing agent. The neutralization ratio of a neutralizing agent can be calculated from the acid value measured by the above-described method. In Examples described below, analysis was performed as follows. A liquid containing a urethane resin was diluted with water to prepare a sample. This sample was subjected to electrophoretic chromatography (trade name: "Agilent 1600 CE", manufactured by Agilent Technologies) to separate a neutralizing agent, and identification of the type and measurement of the quantity of the neutralizing agent were performed by mass spectrometry. The neutralization ratio of the neutralizing agent was calculated from thus-obtained the type and quantitative value of the neutralizing agent and the acid value measured by the above-described method. When an aqueous ink for ink jet recording has a pH within a general range, i.e., about 5.0 to 10.0, it can be said that the agent neutralizing the acid group of the urethane resin is not changed even if the ink is prepared by a usual procedure.

Physical Properties and Characteristics of Urethane Resin
Acid Value Based on Unit Present at Molecular Terminal of Urethane Resin and Derived from the Polyol Having Acid Group The acid value based on the unit present at a molecular terminal of the urethane resin and derived from a polyol having acid group is required to be 20 mgKOH/g or less, in particular, 15 mgKOH/g or less. The acid value can be 0 mgKOH/g or more, in particular, 5 mgKOH/g or more. As described above, an acid value of more than 20 mgKOH/g causes insufficient color developability.

The acid value based on the unit present at a molecular terminal of an urethane resin and derived from a polyol having acid group can be adjusted by, for example, the following two methods. In a first method, for example, in synthesis of the urethane resin, the polyol having acid group is subjected to a multistage reaction. In a second method, in synthesis of the urethane resin, the residual rate of unreacted isocyanate group is controlled such that the polyol having acid group is reacted at a molar ratio lower than the residual rate. More specifically, for example, in synthesis of a prepolymer, the amount of the polyol having acid group is adjusted based on the residual rate of the isocyanate group present at the terminal and the amount of the primary monoalcohol for adjusting the urethane bond to a desired ratio. The amount of the polyol having acid group and the acid value based on the "unit derived from a polyol having acid group" present at a molecular chain terminal are in an inverse proportional relationship due to occurrence of a chain extension reaction. Accordingly, an increase in the amount of the polyol having acid group decreases the acid value, and in contrast, a decrease in the amount of the polyol having acid group increases the acid value. In Examples described below, the acid value based on the unit present at a molecular terminal of a urethane resin and derived from the polyol having acid group was adjusted by the second method.

The acid value based on the unit present at a molecular terminal of a urethane resin and derived from the polyol having acid group can be calculated as follows. The urethane resin is analyzed by carbon nuclear magnetic resonance ($^{13}$C-NMR) spectrometry, and the integrated values of the peaks corresponding to the carboxylic acid group present in the inside and at a molecular chain terminal are respectively calculated. The ratio of the integrated value of the peak corresponding to the carboxylic acid group present at a terminal of a molecular chain to the total integrated value of the peaks corresponding to all the carboxylic acid group is calculated. Consequently, the acid value based on the unit present at a molecular terminal of the urethane resin and derived from the polyol having acid group can be calculated.

Ratio of Urethane Bond Formed by Specific Unit

The rate (mol %) of the urethane bond formed by the units derived from a polyisocyanate and a primary monoalcohol accounting for the total of the urethane bond and the urea bond in the urethane resin is required to be 5 mol % or more to 20 mol % or less, in particular, 10 mol % or more to 15 mol % or less. As described above, a rate less than 5 mol % causes insufficient glossiness and image clarity, and a rate of more than 20 mol % causes insufficient glossiness.

The rate of the urethane bond formed by the units derived from the polyisocyanate and the primary monoalcohol can be adjusted by, for example, the following two methods. In a first method, the amount of the amine compound used in the synthesis of a urethane resin is controlled. In this method, the amount of the urea bond generated by a reaction of an amine compound and an isocyanate group is controlled. In a second method, the residual rate of the unreacted isocyanate group is controlled during the phase inversion of the urethane resin into water. In this method, the amount of the urea bond generated by a reaction of water and an isocyanate group is controlled. In Examples described below, the ratio of the urethane bond formed by the units derived from polyisocyanate and primary monoalcohol was adjusted by the second method.

The ratio of the urethane bond formed by a specific unit can be calculated as follows. The urethane resin is analyzed by carbon nuclear magnetic resonance ($^{13}$C-NMR) spectrometry, and whether the unit present at a molecular chain terminal is derived from primary monoalcohol or not can be determined from the position of the peak corresponding to the urethane bond and the integrated value of the peak. Consequently, the ratio of urethane bond formed by the units derived from polyisocyanate and primary monoalcohol can be determined.

Acid Value

The urethane resin can have an acid value of 5 mgKOH/g or more to 200 mgKOH/g or less, preferably 40 mgKOH/g or more to 140 mgKOH/g or less, more preferably 30 mgKOH/g or more to 90 mgKOH/g or less, more preferably 40 mgKOH/g or more to 90 mgKOH/g or less and most preferably 60 mgKOH/g or more to 90 mgKOH/g or less. This acid value includes the acid value based on the unit present at a molecular terminal of the urethane resin and derived from the polyol having acid group. The acid value of a urethane resin can be adjusted by, for example, the ratio of the unit derived from the polyol having acid group in the urethane resin.

The acid value of a urethane resin can be measured by a titration method. In Examples described below, the acid value of a urethane resin dissolved in tetrahydrofuran was measured by colloid titration using potential difference with a potential-difference automatic titration apparatus (trade name: AT-510, manufactured by Kyoto Electronics Manufacturing Co., Ltd.) loaded with a flow potential titration unit (PCD-500). The titration reagent used in this occasion was an ethanol solution of potassium hydroxide.

Weight-Average Molecular Weight

The urethane resin can have a weight-average molecular weight of 4,000 or more to 25,000 or less. If the weight-average molecular weight of the urethane resin is less than 4,000, the urethane bond in the urethane resin is apt to be decreased, and the intermolecular interaction hardly occurs, leading to insufficient image clarity in some images. In contrast, if the weight-average molecular weight of the urethane resin is more than 25,000, the urethane resin physically drags the pigment and is apt to aggregate in a state of large steric hindrance, and the voids in the pigment layer are hardly decreased, leading to insufficient glossiness in some images. The weight-average molecular weight is a value in terms of polystyrene measured by gel permeation chromatography (GPC).

Ratio of Urethane Bond

The rate (mol %) of the urethane bond accounting for the total of the urethane bond and the urea bond in a urethane resin can be 85 mol % or more to 100 mol % or less. The urethane bond as the target for calculating the rate is the whole urethane bond in the urethane resin including the urethane bond formed by the above-described specific unit. Hereinafter, "rate (mol %) of the urethane bond accounting for the total of the urethane bond and the urea bond in the urethane resin" may be simply referred to as "rate of the urethane bond". A urea bond has two —NH— moieties and forms a stronger intermolecular hydrogen bond compared to a urethane bond having a single —NH— moiety. If the rate of the urethane bond is less than 85 mol %, the glossiness of some images is insufficient. This is caused by that the urea bond is increased to form a stronger intermolecular hydrogen bond, the urethane resin physically drags the pigment and is apt to aggregate in a state of large steric hindrance, and the voids in the pigment layer are hardly decreased.

The rate of the urethane bond in a urethane resin can be adjusted by, for example, the following two methods. In a first method, the amount of the amine compound used in the synthesis of the urethane resin is controlled. In this method, the amount of the urea bond generated by a reaction of an amine compound and an isocyanate group is controlled. Specifically, the urethane resin is synthesized by the following method. Different types of the urethane resin are synthesized by using different amounts of the amine compound, and the rate of the urethane bond is calculated by the method described below. The relationship between the amount of the amine compound and the rate of the urethane bond is investigated from the resulting rates of the urethane bond to form a calibration curve. Using this calibration curve, the amount of the amine compound necessary for synthesizing the urethane resin having a desired rate of the urethane bond is determined. A calibration curve is formed in advance because that even if the same amine compound is used, for example, the reaction rate may change if other components are different, resulting in different rate of the urethane bond.

In a second method, the residual rate of the unreacted isocyanate group is controlled during the phase inversion of the urethane resin into water. In this method, the amount of the urea bond generated by a reaction of water and an isocyanate group is controlled. Specifically, the urethane resin is synthesized by the following method. In the middle of the reaction synthesizing the urethane resin, the residual rate of the isocyanate group with respect to the amount of used polyisocyanate is determined with a Fourier transform infrared spectrophotometer (FT-IR). The residual rate of the isocyanate group can be controlled by changing the reaction time and the amount of polyisocyanate. At the point when the residual rate of the isocyanate group reached the same value as the desired ratio of the urethane bond, ion-exchanged water is added to the reaction system. For example, in a case of synthesizing a urethane resin having a rate of urethane bond of 95 mol %, ion-exchanged water is added at a point when the residual rate of the isocyanate group derived from the charged polyisocyanate reached 5 mol %. In Examples described below, the rate of the urethane bond in a urethane resin was adjusted by the second method.

An isocyanate group and amine react with each other to form a urea bond. Accordingly, when polyamine is used, the amount of the polyamine should be determined such that the rate of the urethane bond in the urethane resin becomes a desired ratio.

The rate of the urethane bond in a urethane resin can be confirmed as follows. Specifically, the rate is determined from the ratios of the integrated values of the peaks of the urethane bond and the urea bond calculated from the results of analysis of the urethane resin dissolved in deuterated dimethyl sulfoxide by carbon nuclear magnetic resonance ($^{13}$C-NMR) method. The positions of the peaks of a urethane bond and a urea bond vary depending on the types of the compounds used in synthesis of the urethane resin. Accordingly, it is necessary to investigate the positions of the urethane bond and the urea bond in the compounds used in the synthesis of the urethane resin. A method for the investigation is shown below.

The composition of a urethane resin, specifically, a polyisocyanate and a component (e.g., polyol or polyamine) reacting with the polyisocyanate are analyzed. The composition of a urethane resin can be analyzed by the procedure described below. In order to confirm the chemical shifts of the urethane bond and the urea bond corresponding to the polyisocyanate, the following operation is performed. Polyisocyanate and one of compounds (polyol, polyamine and water) reacting with the polyisocyanate are used to prepare reaction products. For example, if a polyol having no acid group and a polyamine are used in combination, a reaction product (i) of the polyisocyanate and the polyol having no acid group, a reaction product (ii) of the polyisocyanate and the polyamine and a reaction product (iii) of the polyisocyanate and water are prepared. The thus-prepared reaction products are each dissolved in deuterated dimethyl sulfoxide, and the solutions are analyzed by a carbon nuclear magnetic resonance ($^{13}$C-NMR) method to confirm chemical shifts of the urethane bond and the urea bond in each reaction product.

In the example above, the chemical shift of the urethane bond is confirmed from the reaction product (i), and the chemical shift of the urea bond is confirmed from the reaction products (ii) and (iii). The peaks of the urethane bond and the urea bond are then specified from the resulting chemical shifts, respectively, and the rate of the urethane bond in a urethane resin is calculated from the ratio of the integrated values of the peaks.

In Examples described below, the rate of the urethane bond in a urethane resin was determined as follows. An excess amount of an acid (hydrochloric acid) was added to a solution containing a synthesized urethane resin, and precipitated urethane resin was collected. The resulting urethane resin was dried and was then dissolved in deuterated dimethyl sulfoxide to prepare a sample. Regarding this sample, the integrated values of the peaks of chemical shifts of the urethane bond and the urea bond were determined by a carbon nuclear magnetic resonance ($^{13}$C-NMR) method using a nuclear magnetic resonance apparatus (trade name: "Avance500", manufactured by BRUKER Bio Spin Corp.). The rate of the urethane bond was determined from the ratios of the integrated values of these peaks.

State of Urethane Resin

The urethane resin may be dissolved in an aqueous medium constituting an ink and exist in a state without particle size (water-soluble urethane resin) or may be dispersed in an aqueous medium constituting an ink and exist in a state with particle size (water dispersible urethane resin). A water-insoluble urethane resin exists in a state of resin particles in an ink.

Whether a urethane resin is "water-soluble" or "water-dispersible" can be judged by the following method. A solution containing a urethane resin (resin solid content: 10 mass %) neutralized with an alkali (e.g., sodium hydroxide or potassium hydroxide) in an amount corresponding to the acid value is prepared. The prepared solution is then diluted 10-fold (volume basis) with pure water to prepare a sample solution. The particle size of the resin in the sample solution is measured by dynamic light scattering. If particles having a particle size are detected, the resin can be judged to be "resin particles". The measurement conditions on this occasion can be, for example, SetZero: 30 seconds, number of measurements: 3 times, measurement time: 180 seconds, shape: real spherical shape and index of refraction: 1.59. The particle size distribution measuring apparatus can be, for example, a particle size analyzer (e.g., trade name: "UPA-EX150", manufactured by Nikkiso Co., Ltd.) for dynamic light scattering, but the particle size distribution measuring apparatus and measurement conditions are not limited thereto.

Method of Synthesizing Urethane Resin

The urethane resin can be synthesized by any known method for generally employed for synthesizing a urethane resin, such as the following method. Polyisocyanate is reacted with a compound (polyol or polyamine) reacting with the polyisocyanate in amounts giving a large number of isocyanate groups to synthesize a prepolymer having an isocyanate group at a terminal of the molecule. On this occasion, an organic solvent having a boiling point of 100° C. or less may be used as needed, and the acid group of the prepolymer is neutralized with a neutralizing agent. Subsequently, the prepolymer is added to a solution containing, for example, a monovalent monoalcohol, a chain extender, and a crosslinking agent to perform a termination reaction, an extension reaction, a crosslinking reaction and so on. When an organic solvent is used, the organic solvent is then removed to obtain a urethane resin.

The number of a reactive group (e.g., isocyanate group, hydroxy group, amino group or imino group) per one molecule of a compound (e.g., polyisocyanate, polyol or polyamine) to be used for synthesis of a urethane resin is determined depending on the characteristics of a desired urethane resin. For example, a compound having one reactive group per one molecule becomes a unit present at a molecular terminal of the urethane resin. A compound having two or more reactive groups per one molecule becomes a unit present at a position between different units constituting the urethane resin. In particular, a compound having three or more reactive groups per one molecule becomes a unit for crosslinking the urethane resin. In order to crosslink a urethane resin, a unit derived from a compound having three or more reactive groups per one molecule is used as a structural unit according to a desired degree of crosslinking. Conversely, in order not to crosslink a urethane resin, only a unit derived from a compound having one or two reactive groups per one molecule is used as a structural unit.

Analysis Method

The composition of a urethane resin can be analyzed by the following method. A method for extracting a urethane resin from an ink containing the urethane resin will now be described. Specifically, the ink is centrifuged at 80,000 rpm, and the supernatant is collected. An excess amount of an acid (such as hydrochloric acid) is added to the supernatant to precipitate the urethane resin. The supernatant may be dried to collect the urethane resin. Alternatively, a urethane resin can be extracted from an ink using an organic solvent (e.g., hexane) that does not dissolve a pigment, but dissolves the urethane resin. Furthermore, the urethane resin can be analyzed in an ink, but by using the urethane resin. (solid content) extracted by the above-described method, analysis with higher accuracy is possible.

The urethane resin collected as described above is dried and is dissolved in deuterated dimethyl sulfoxide to prepare a sample as a measurement object. This sample is subjected to a proton nuclear magnetic resonance ($^1$H-NMR) method, and the types of, for example, polyisocyanate, polyol, polyamine and primary monoalcohol can be determined from the positions of the resulting peaks. Furthermore, the composition ratio of each component can also be calculated from the rate of the integrated value of the peak of chemical shift of the component. The number of repetitions of the polyol having no acid group unit is determined by analysis by carbon nuclear magnetic resonance ($^{13}$C-NMR) spectrometry, and number-average molecular weight can be calculated. The types of polyisocyanate, polyol, polyamine, primary monoalcohol and so on can also be confirmed by analysis by pyrolysis gas chromatography.

Content

The content (mass %) of the urethane resin in an ink can be 0.1 mass % or more to 10.0 mass % or less based on the total mass of the ink, in particular, 0.5 mass % or more to 3.0 mass % or less. The mass ratio of the content (mass %) of the urethane resin to the content (mass %) of the pigment based on the total mass of the ink can be 0.05 times or more to 2.00 times or less. When the mass ratio is less than 0.05 times, the amount of the urethane resin relative to the amount of the pigment is too small, and the effect of smoothing the surface of the pigment layer is weak, leading to insufficient image clarity in some images. In contrast, when the mass ratio is more than 2.00 times, the amount of the urethane resin relative to the amount of the pigment is too large, the excess urethane resin remains after filling the voids in the pigment layer, and the smoothness of the surface of the pigment layer is slightly decreased, leading to insufficient glossiness in some images.

Pigment

The coloring material contained in the ink of the present invention is a pigment, such as an inorganic pigment and an organic pigment. Examples of the pigment species include inorganic pigments, such as carbon black, calcium carbonate and titanium oxide; and organic pigments, such as azo, phthalocyanine and quinacridone. The ink may further contain a dye, in addition to the pigment, for example, for toning. The content (mass %) of the pigment in the ink can be 0.5 mass % or more to 10.0 mass % or less based on the total mass of the ink, in particular, 1.0 mass % or more to 10.0 mass % or less.

The system of dispersing a pigment may be either a resin-dispersed pigment where a resin dispersant is used or a self-dispersible pigment not requiring a resin dispersant. In order to efficiently exhibit the film characteristics of a urethane resin and to enhance the abrasion resistance of an image, the interaction of the urethane resin and the pigment should be decreased to a certain degree. Accordingly, a resin-dispersed pigment using a resin, such as an acrylic resin, different from the urethane resin as a dispersant or a self-dispersible pigment not requiring a use of dispersant can be used.

The resin dispersant to be used in the resin-dispersed pigment can be any known (co)polymer that can be used in an ink for ink jet recording. The resin dispersant can be, for example, a copolymer (e.g., acrylic resin) having a hydrophilic unit and a hydrophobic unit. Examples of the hydrophilic unit include a unit derived from a hydrophilic monomer, such as (meth)acrylic acid and its salt. Examples of the hydrophobic unit include a unit derived from a monomer having an aromatic ring, such as styrene and its derivative and benzyl (meth)acrylate and a unit derived from a hydrophobic monomer, such as a monomer including an aliphatic group such as (meth)acrylic acid ester.

The self-dispersible pigment can be a pigment of which the particle surface has an anionic group bonded directly or via an atomic group (—R—). Examples of the anionic group include —COOM, —SO$_3$M and —PO$_3$M$_2$, where Ms each independently represent a hydrogen atom, an alkali metal, ammonium (NH$_4$) or organic ammonium. Examples of the atomic group (—R—) include an alkylene group, an arylene group, an amide group, a sulfonyl group, an imino group, a carbonyl group, an ester group, an ether group and combinations of these groups.

Aqueous Medium

The ink of the present invention at least contains water as an aqueous medium. The water can be deionized water (ion-exchanged water). The content (mass %) of water in an ink can be 10.0 mass % or more to 90.0 mass % or less based on the total mass of the ink, in particular, 50.0 mass % or more to 90.0 mass % or less.

The aqueous medium may further contain a water-soluble organic solvent. The water-soluble organic solvent may be any water-soluble solvent, such as mono- or polyvalent alcohol, poly(alkylene glycol), glycol ether, a nitrogen-containing polar solvent, or a sulfur-containing polar solvent. The content (mass %) of the water-soluble organic solvent in an ink can be 3.0 mass % or more to 50.0 mass % or less based on the total mass of the ink.

Other Additives

The ink of the present invention may further optionally contain a water-soluble organic compound that is a solid at ordinary temperature, for example, polyvalent alcohol, such as trimethylolpropane and trimethylolethane, and a urea derivative, such as urea and ethylene urea, in addition to the above-described components. Furthermore, the ink of the present invention may optionally contain various additives, such as a surfactant, a pH adjuster, a rust preventive, a preservative, a fungicide, an antioxidant, a reduction inhibitor, an evaporation promoter, a chelating agent and a water-soluble resin.

Physical Properties of Ink

In the present invention, the ink can have a pH, a static surface tension and a viscosity within the following ranges at 25° C. The pH can be 5.0 or more to 10.0 or less, in particular, 7.0 or more to 9.5 or less. The static surface tension can be 30 mN/m or more to 45 mN/m or less, in particular, 35 mN/m or more to 40 mN/m or less. The viscosity can be 1.0 mPa·s or more to 5.0 mPa·s or less.

Ink Cartridge

The ink cartridge of the present invention includes an ink and an ink storage portion storing the ink. The ink stored in the ink storage portion is the ink of the present invention described above. FIG. 1 is a cross-sectional view schematically illustrating an embodiment of the ink cartridge of the present invention. As shown in FIG. 1, the bottom of the ink cartridge is provided with an ink supplying port 12 for supplying the ink to a recording head. The inside of the ink cartridge is the ink storage portion for storing the ink. The ink storage portion is composed of an ink storing chamber 14 and an absorber containing chamber 16. The ink storing chamber 14 and the absorber containing chamber 16 are communicated with each other through a communication port 18. The absorber containing chamber 16 is communicated with the ink supplying port 12. The ink storing chamber 14 stores an ink 20 in a liquid form. The absorber containing chamber 16 stores absorbers 22 and 24 holding the ink impregnated therein. The ink storage portion need not have the ink storing chamber for storing the ink in a liquid form and may have a configuration of holding the entire ink with the absorbers. Alternatively, the ink storage portion need not have the absorbers and may have a configuration of storing the entire ink in a liquid form. Furthermore, the ink cartridge may be in a configuration including an ink storage portion and a recording head.

Ink Jet Recording Method

The ink jet recording method of the present invention is a method of recording an image on a recording medium by ejecting the above-described ink of the present invention from a recording head of an ink jet system. Examples of the system for ejecting an ink include a system of applying a mechanical energy to an ink and a system of applying a thermal energy to an ink. In the present invention, a system of ejecting an ink by applying a thermal energy to an ink can be particularly employed. The process of the ink jet recording method may be a known process except that the ink of the present invention is used.

Figure 2A:
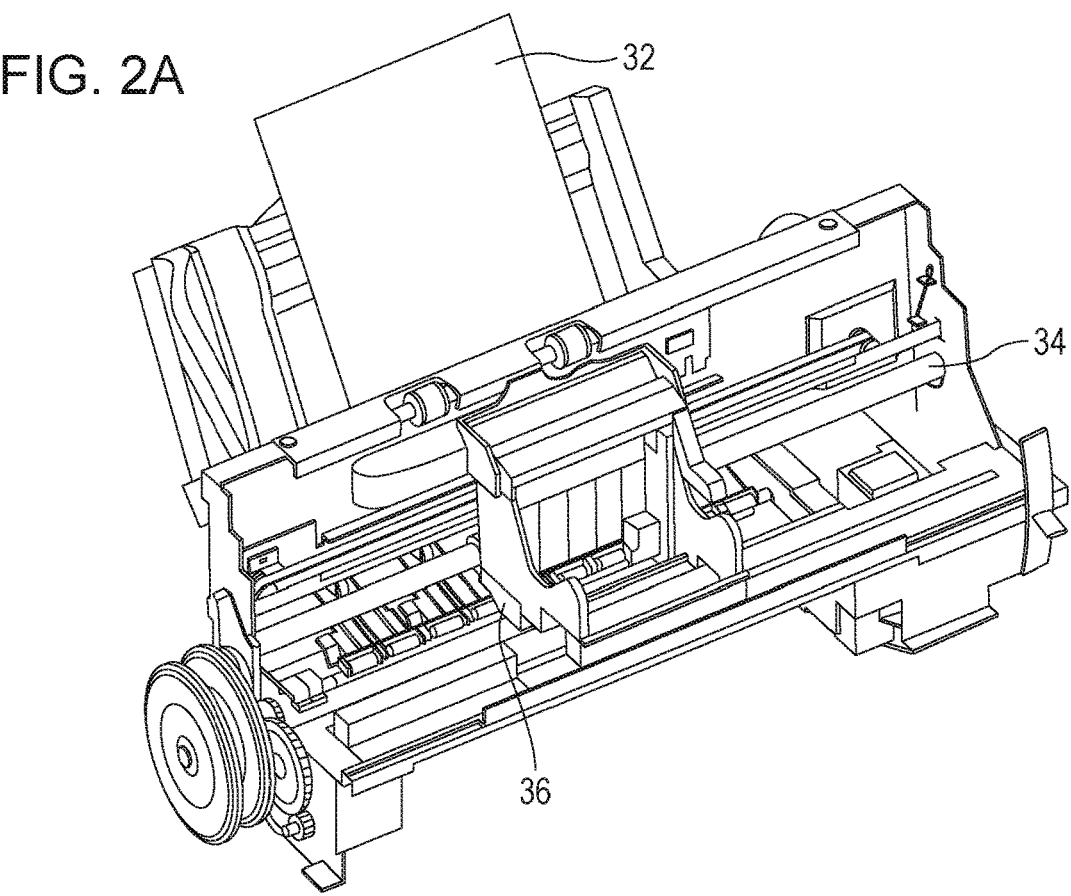
FIGS. 2A and 2B are diagrams schematically illustrating an example of the ink jet recording apparatus to be used in the ink jet recording method of the present invention.
Figure 2B:
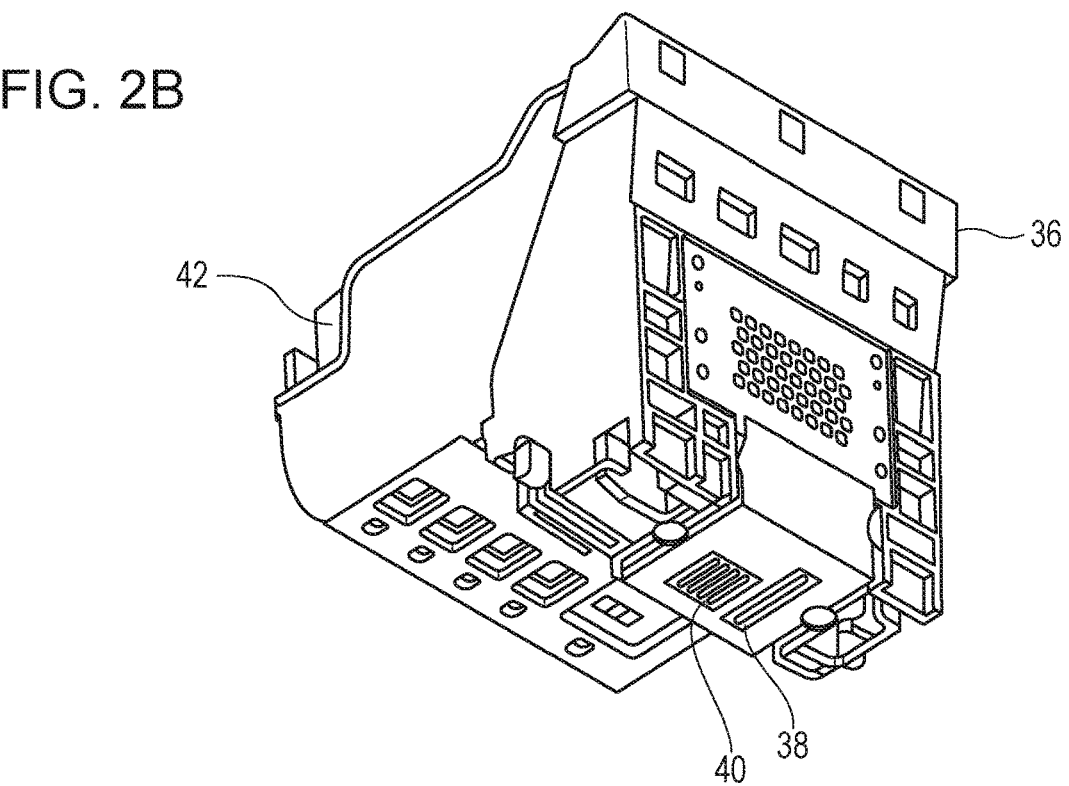

FIGS. 2A and 2B are diagrams schematically illustrating an example of the ink jet recording apparatus to be used in the ink jet recording method of the present invention. FIG. 2A is a perspective view of the main portion of the ink jet recording apparatus, and FIG. 2B is a perspective view of the head cartridge. The ink jet recording apparatus includes a conveying means (not shown) for conveying a recording medium 32 and a carriage shaft 34. The carriage shaft 34 can be loaded with a head cartridge 36. The head cartridge 36 includes recording heads 38 and 40 and is configured such that an ink cartridge 42 is set.

During the head cartridge 36 is conveyed in the main scanning direction along the carriage shaft 34, an ink (not shown) is ejected from the recording heads 38 and 40 to the recording medium 32. The recording medium 32 is conveyed in the sub-scanning direction by the conveying means (not shown) to record an image on the recording medium 32.

EXAMPLES

The present invention will now be described in more detail by Examples and Comparative Examples, but is not limited to the following Examples within the scope of the invention. The terms "part (s)" and "%" regarding the amounts of components are based on mass unless otherwise specified.

The abbreviations are as follows IPDI: isophorone diisocyanate, H12MDI: 4,4'-dicyclohexylmethane diisocyanate, HDI: hexamethylene diisocyanate, TDI: tolylene diisocyanate, MDI: diphenylmethane diisocyanate, PPG: polypropylene glycol, PES: polyester polyol, T6002: 1,6-hexanediol polycarbonate (number-average molecular weight: 2,000, manufactured by Asahi Kasei Corporation), T5652: 1,6-hexanediol and 1,5-pentanediol polycarbonates (number-average molecular weight: 2,000, manufactured by Asahi Kasei Corporation), PTMG: polytetramethylene glycol, PEG: polyethylene glycol, EDA: ethylene diamine, DETA: diethylene triamine, NPG: neopentyl glycol, TMP: trimethylolpropane, DMPA: dimethylolpropionic acid, DMBA: dimethylolbutanoic acid, TEA: triethanolamine. The numbers attached to PPG, PES, PTMG and PEG mean the number-average molecular weights.

Synthesis of Urethane Resin

Urethane Resins 1 to 51

Polyisocyanate and polyol having no acid group were placed in a four-necked flask equipped with a stirrer, a thermometer, a nitrogen gas introducing pipe and a reflux pipe in the amounts shown in Table 1 and were reacted under a nitrogen gas atmosphere at 100° C. for 2 hours. Subsequently, a polyol having acid group in the amount shown in Table 1 and 150.0 parts of methyl ethyl ketone were added to the flask. The reaction was performed at 78° C. until the residual rate of the isocyanate group reached a desired level while measuring the residual rate of the isocyanate group by FT-IR. Monoalcohol in the amount shown in Table 1 and 300.0 parts of ion-exchanged water were further added to the flask to obtain a reaction solution. The resulting reaction solution was cooled to 40° C., and ion-exchanged water was then added to the reaction solution. Neutralizing agents shown in Table 1 in the amounts giving the neutralization rates of the acid group shown in Table 1 were added thereto while stirring at high speed with a homomixer to obtain each solution containing a resin. Methyl ethyl ketone was distilled from the resulting solution by heating under reduced pressure to prepare solutions containing urethane resins 1 to 51 (solid contents) each in an amount of 30.0%.

Urethane Resin 52

A urethane resin was synthesized in accordance with Example 1 in Japanese Patent Laid-Open No. 2006-283009 (excluding the component relating to neutralization), and ion-exchanged water was then added thereto. The neutralizing agents in the amounts giving the neutralization rates shown in Table 1 were added thereto while stirring at high speed with a homomixer to obtain a solution containing a resin. The solvent was distilled from the resulting solution by heating under reduced pressure to prepare a solution containing urethane resin 52 (solid content) in an amount of 30.0%.

Urethane Resin 53

A urethane resin was synthesized in accordance with Example 1 in Japanese Patent Laid-Open No. 2011-102335 (excluding the component relating to neutralization), and ion-exchanged water was then added thereto. The neutralizing agents in the amounts giving the neutralization rates shown in Table 1 were added thereto while stirring at high speed with a homomixer to obtain a solution containing a resin. The solvent was distilled from the resulting solution by heating under reduced pressure to prepare a solution containing urethane resin 53 (solid content) in an amount of 30.0%.

Urethane Resin 54

A urethane resin was synthesized in accordance with the method synthesizing PU-1 in Japanese Patent Laid-Open No. 2012-214712 (excluding the component relating to neutralization), and ion-exchanged water was then added thereto. The neutralizing agents in the amounts giving the neutralization rates shown in Table 1 were added thereto while stirring at high speed with a homomixer to obtain a solution containing a resin. The solvent was distilled from the resulting solution by heating under reduced pressure to prepare a solution containing urethane resin 54 (solid content) in an amount of 30.0%.

Urethane Resin 55

A urethane resin was synthesized in accordance with the method synthesizing urethane resin 16 in Japanese Patent Laid-Open No. 2016-138227 (excluding the component relating to neutralization), and ion-exchanged water was then added thereto. The neutralizing agents in the amounts giving neutralization rates shown in Table 1 were added thereto while stirring at high speed with a homomixer to obtain a solution containing a resin. The solvent was distilled from the resulting solution by heating under reduced pressure to prepare a solution containing urethane resin 55 (solid content) in an amount of 30.0%.

Urethane Resin 56

IPDI (33.0 parts) and PPG2,000 (49.6 parts) were placed in a four-necked flask equipped with a stirrer, thermometer, a cooler and a nitrogen gas introducing pipe and were reacted under a nitrogen gas atmosphere at 100° C. for 2 hours. Subsequently, NPG (1.8 parts), DMPA (4.8 parts), glycolic acid (10.8 parts) and methyl ethyl ketone (150.0 parts) were added to the flask. The reaction was performed at 80° C. until the residual rate of the isocyanate group reached a desired level while measuring the residual rate by FT-IR to obtain a reaction solution. The resulting reaction solution was cooled to 40° C., and ion-exchanged water was then added to the reaction solution. Neutralizing agents in the amounts giving the neutralization rates shown in Table 1 were added thereto while stirring at high speed with a homomixer to obtain a solution containing a resin. Methyl ethyl ketone was distilled from the resulting solution by heating under reduced pressure to prepare a solution containing urethane resin 56 (solid content) in an amount of 30.0%.

Synthesis Conditions and Characteristics of Urethane Resin

Tables 1 and 2 show synthesis conditions and characteristics of the above-described urethane resins. The "acid value based on the unit present at a molecular terminal of the urethane resin and derived from the polyol having acid group" is expressed as "acid value at molecular terminal". The "rate of the urethane bond formed by the units derived from polyisocyanate and primary monoalcohol accounting for the total of the urethane bond and the urea bond" is expressed as "rate of urethane bond based on monoalcohol". The "rate of the urethane bond accounting for the total of the urethane bond and the urea bond" is expressed as "Rate of urethane bond".

TABLE 1

Conditions of synthesizing urethane resin

| | | Polyisocyanate (part) | Polyol having no acid group (part) | Chain extender (part) | Polyol having acid group (part) | Monoalcohol (part) | Neutralizing agent 1 Type | Neutralization ratio (%) | Neutralizing agent 2 Type | Neutralization ratio (%) |
|---|---|---|---|---|---|---|---|---|---|---|
| No. of urethane resin | 1 | IPDI: 34.5 | PPG2,000: 49.8 | EDA: 0.3 | DMPA: 14.1 | Methanol: 1.3 | KOH | 85 | TEA | 5 |
| | 2 | H12MDI: 39.8 | PPG2,000: 44.5 | EDA: 0.3 | DMPA: 14.1 | Methanol: 1.3 | KOH | 85 | TEA | 5 |
| | 3 | HDI: 26.9 | PPG2,000: 57.3 | EDA: 0.3 | DMPA: 14.1 | Methanol: 1.4 | KOH | 85 | TEA | 5 |
| | 4 | TDI: 27.8 | PPG2,000: 56.5 | EDA: 0.3 | DMPA: 14.1 | Methanol: 1.4 | KOH | 85 | TEA | 5 |
| | 5 | MDI: 38.2 | PPG2,000: 46.1 | EDA: 0.3 | DMPA: 14.1 | Methanol: 1.3 | KOH | 85 | TEA | 5 |
| | 6 | IPDI: 34.5 | PES2,000: 49.8 | EDA: 0.3 | DMPA: 14.1 | Methanol: 1.3 | KOH | 85 | TEA | 5 |
| | 7 | IPDI: 34.5 | T6002: 49.8 | EDA: 0.3 | DMPA: 14.1 | Methanol: 1.3 | KOH | 85 | TEA | 5 |
| | 8 | IPDI: 34.5 | T5652: 49.8 | EDA: 0.3 | DMPA: 14.1 | Methanol: 1.3 | KOH | 85 | TEA | 5 |
| | 9 | IPDI: 34.5 | PTMG2,000: 49.8 | EDA: 0.3 | DMPA: 14.1 | Methanol: 1.3 | KOH | 85 | TEA | 5 |
| | 10 | IPDI: 34.5 | PEG2,000: 49.8 | EDA: 0.3 | DMPA: 14.1 | Methanol: 1.3 | KOH | 85 | TEA | 5 |
| | 11 | IPDI: 34.4 | PPG2,000: 49.8 | DETA: 0.3 | DMPA: 14.1 | Methanol: 1.3 | KOH | 85 | TEA | 5 |
| | 12 | IPDI: 34.4 | PPG2,000: 49.6 | NPG: 0.5 | DMPA: 14.1 | Methanol: 1.3 | KOH | 85 | TEA | 5 |
| | 13 | IPDI: 34.4 | PPG2,000: 49.7 | TMP: 0.4 | DMPA: 14.1 | Methanol: 1.3 | KOH | 85 | TEA | 5 |
| | 14 | IPDI: 34.3 | PPG2,000: 48.7 | EDA: 0.3 | DMBA: 15.4 | Methanol: 1.3 | KOH | 85 | TEA | 5 |
| | 15 | IPDI: 34.3 | PPG2,000: 49.5 | EDA: 0.3 | DMPA: 14.1 | Ethanol: 1.8 | KOH | 85 | TEA | 5 |
| | 16 | IPDI: 33.9 | PPG2,000: 49.0 | EDA: 0.3 | DMPA: 13.9 | Isobutanol: 2.9 | KOH | 85 | TEA | 5 |
| | 17 | IPDI: 32.8 | PPG2,000: 47.4 | EDA: 0.3 | DMPA: 13.5 | Decanol: 6.0 | KOH | 85 | TEA | 5 |
| | 18 | IPDI: 32.4 | PPG2,000: 46.9 | EDA: 0.3 | DMPA: 13.3 | Dodecanol: 7.0 | KOH | 85 | TEA | 5 |
| | 19 | IPDI: 26.8 | PPG2,000: 62.1 | EDA: 0.2 | DMPA: 9.4 | Methanol: 1.0 | KOH | 85 | TEA | 5 |
| | 20 | IPDI: 45.8 | PPG1,000: 31.0 | EDA: 0.4 | DMPA: 21.1 | Methanol: 1.7 | KOH | 85 | TEA | 5 |
| | 21 | IPDI: 34.9 | PPG2,000: 49.2 | EDA: 0.3 | DMPA: 14.1 | Methanol: 1.5 | KOH | 85 | TEA | 5 |
| | 22 | IPDI: 34.0 | PPG1,000: 50.5 | EDA: 0.3 | DMPA: 14.2 | Methanol: 1.1 | KOH | 85 | TEA | 5 |
| | 23 | IPDI: 32.1 | PPG2,000: 52.9 | EDA: 0.3 | DMPA: 14.3 | Methanol: 0.5 | KOH | 85 | TEA | 5 |
| | 24 | IPDI: 33.2 | PPG2,000: 51.4 | EDA: 0.3 | DMPA: 14.2 | Methanol: 0.9 | KOH | 85 | TEA | 5 |
| | 25 | IPDI: 33.6 | PPG2,000: 51.0 | EDA: 0.3 | DMPA: 14.2 | Methanol: 1.0 | KOH | 85 | TEA | 5 |
| | 26 | IPDI: 35.3 | PPG2,000: 48.8 | EDA: 0.3 | DMPA: 14.1 | Methanol: 1.6 | KOH | 85 | TEA | 5 |
| | 27 | IPDI: 35.5 | PPG2,000: 48.5 | EDA: 0.3 | DMPA: 14.1 | Methanol: 1.6 | KOH | 85 | TEA | 5 |
| | 28 | IPDI: 37.0 | PPG2,000: 46.6 | EDA: 0.3 | DMPA: 14.0 | Methanol: 2.1 | KOH | 85 | TEA | 5 |
| | 29 | IPDI: 34.5 | PPG2,000: 49.8 | EDA: 0.3 | DMPA: 14.1 | Methanol: 1.3 | KOH | 85 | TEA | 5 |
| | 30 | IPDI: 34.5 | PPG2,000: 49.8 | EDA: 0.3 | DMPA: 14.1 | Methanol: 1.3 | KOH | 85 | TEA | 5 |
| | 31 | IPDI: 34.5 | PPG2,000: 49.8 | EDA: 0.3 | DMPA: 14.1 | Methanol: 1.3 | KOH | 85 | TEA | 5 |
| | 32 | IPDI: 34.5 | PPG2,000: 49.8 | EDA: 0.3 | DMPA: 14.1 | Methanol: 1.3 | KOH | 85 | TEA | 5 |

TABLE 1-continued

Conditions of synthesizing urethane resin

| | Polyisocyanate (part) | Polyol having no acid group (part) | Chain extender (part) | Polyol having acid group (part) | Monoalcohol (part) | Neutralizing agent 1 Type | Neutralization ratio (%) | Neutralizing agent 2 Type | Neutralization ratio (%) |
|---|---|---|---|---|---|---|---|---|---|
| 33 | IPDI: 39.6 | PPG2,000: 43.0 | EDA: 1.7 | DMPA: 14.1 | Methanol: 1.5 | KOH | 85 | TEA | 5 |
| 34 | IPDI: 39.3 | PPG2,000: 43.6 | EDA: 1.6 | DMPA: 14.1 | Methanol: 1.5 | KOH | 85 | TEA | 5 |
| 35 | IPDI: 33.2 | PPG2,000: 51.5 | — | DMPA: 14.2 | Methanol: 1.2 | KOH | 85 | TEA | 5 |
| 36 | IPDI: 34.5 | PPG2,000: 49.8 | EDA: 0.3 | DMPA: 14.1 | Methanol: 1.3 | KOH | 90 | — | — |
| 37 | IPDI: 34.5 | PPG2,000: 49.8 | EDA: 0.3 | DMPA: 14.1 | Methanol: 1.3 | KOH | 89 | TEA | 1 |
| 38 | IPDI: 34.5 | PPG2,000: 49.8 | EDA: 0.3 | DMPA: 14.1 | Methanol: 1.3 | KOH | 88 | TEA | 2 |
| 39 | IPDI: 34.5 | PPG2,000: 49.8 | EDA: 0.3 | DMPA: 14.1 | Methanol: 1.3 | KOH | 88 | TEA | 40 |
| 40 | IPDI: 34.5 | PPG2,000: 49.8 | EDA: 0.3 | DMPA: 14.1 | Methanol: 1.3 | KOH | 46 | TEA | 44 |
| 41 | IPDI: 34.5 | PPG2,000: 49.8 | EDA: 0.3 | DMPA: 14.1 | Methanol: 1.3 | KOH | 45 | TEA | 45 |
| 42 | IPDI: 34.5 | PPG2,000: 49.8 | EDA: 0.3 | DMPA: 14.1 | Methanol: 1.3 | — | — | TEA | 90 |
| 43 | IPDI: 34.5 | PPG2,000: 49.8 | EDA: 0.3 | DMPA: 14.1 | Methanol: 1.3 | KOH | 74 | TEA | 5 |
| 44 | IPDI: 35.6 | PPG2,000: 48.3 | EDA: 0.3 | DMPA: 14.1 | Methanol: 1.7 | KOH | 75 | TEA | 5 |
| 45 | IPDI: 38.0 | PES2,000: 45.2 | EDA: 1.6 | DMPA: 14.1 | Methanol: 1.0 | — | — | TEA | 90 |
| 46 | IPDI: 34.8 | PPG2,000: 50.6 | — | DMPA: 14.3 | — | KOH | 85 | TEA | 5 |
| 47 | IPDI: 34.5 | PPG2,000: 49.8 | EDA: 0.3 | DMPA: 14.1 | 2-Propanol: 1.3 | KOH | 85 | TEA | 5 |
| 48 | IPDI: 33.9 | PPG2,000: 49.0 | EDA: 0.3 | DMPA: 13.9 | Tert-Butanol: 2.9 | KOH | 85 | TEA | 5 |
| 49 | IPDI: 33.5 | PPG1,000: 46.7 | EDA: 0.3 | DMPA: 14.2 | Methanol: 0.9 | KOH | 85 | TEA | 5 |
| 50 | IPDI: 31.8 | PPG2,000: 53.3 | EDA: 0.3 | DMPA: 14.3 | Methanol: 0.4 | KOH | 85 | TEA | 5 |
| 51 | IPDI: 37.6 | PPG2,000: 45.7 | EDA: 0.3 | DMPA: 14.0 | Methanol: 2.4 | KOH | 85 | TEA | 5 |
| 52 | | | | | | KOH | 85 | TEA | 5 |
| 53 | | | | | | KOH | 85 | TEA | 5 |
| 54 | IPDI: 31.3 | PPG2,000: 54.0 | EDA: 0.5 | DMPA: 14.4 | — | KOH | 85 | TEA | 5 |
| 55 | IPDI: 44.5 | PTMG2,000: 41.5 | NPG: 3.0 | DMPA: 11.0 | Methanol: 20.0 | KOH | 85 | TEA | 5 |
| 56 | IPDI: 33.0 | PPG2,000: 49.6 | NPG: 1.8 | DMPA: 4.8 | Glycolic acid: 10.8 | KOH | 85 | TEA | 5 |

TABLE 2

Characteristics of urethane resin

| | | Neutralization ratio of the whole acid group (%) | Acid value at molecular terminal (mgKOH/g) | Rate of urethane bond based on monoalcohol (%) | Weight-average molecular weight | Rate of urethane bond (%) | Acid value (mgKOH/g) |
|---|---|---|---|---|---|---|---|
| No. of urethane resin | 1 | 90 | 12 | 13 | 12,000 | 97 | 59 |
| | 2 | 90 | 12 | 13 | 12,000 | 97 | 59 |
| | 3 | 90 | 12 | 13 | 12,000 | 97 | 59 |
| | 4 | 90 | 12 | 13 | 12,000 | 97 | 59 |
| | 5 | 90 | 12 | 13 | 12,000 | 97 | 59 |
| | 6 | 90 | 12 | 13 | 12,000 | 97 | 59 |
| | 7 | 90 | 12 | 13 | 12,000 | 97 | 59 |
| | 8 | 90 | 12 | 13 | 12,000 | 97 | 59 |
| | 9 | 90 | 12 | 13 | 12,000 | 97 | 59 |
| | 10 | 90 | 12 | 13 | 12,000 | 97 | 59 |
| | 11 | 90 | 12 | 13 | 12,000 | 97 | 59 |
| | 12 | 90 | 12 | 13 | 12,000 | 97 | 59 |
| | 13 | 90 | 12 | 13 | 12,000 | 97 | 59 |
| | 14 | 90 | 12 | 13 | 12,000 | 97 | 59 |
| | 15 | 90 | 12 | 13 | 12,000 | 97 | 59 |
| | 16 | 90 | 12 | 13 | 12,000 | 97 | 58 |
| | 17 | 90 | 12 | 13 | 12,000 | 97 | 56 |
| | 18 | 90 | 12 | 13 | 12,000 | 97 | 56 |
| | 19 | 90 | 12 | 13 | 12,000 | 97 | 40 |
| | 20 | 90 | 12 | 13 | 12,000 | 97 | 90 |
| | 21 | 90 | 0 | 14 | 12,000 | 97 | 59 |
| | 22 | 90 | 20 | 11 | 12,000 | 97 | 59 |
| | 23 | 90 | 12 | 5 | 12,000 | 97 | 60 |
| | 24 | 90 | 12 | 9 | 12,000 | 97 | 59 |
| | 25 | 90 | 12 | 10 | 12,000 | 97 | 59 |
| | 26 | 90 | 12 | 15 | 12,000 | 97 | 59 |
| | 27 | 90 | 12 | 16 | 12,000 | 97 | 59 |
| | 28 | 90 | 12 | 20 | 12,000 | 97 | 59 |
| | 29 | 90 | 12 | 13 | 3,600 | 97 | 59 |
| | 30 | 90 | 12 | 13 | 4,000 | 97 | 59 |
| | 31 | 90 | 12 | 13 | 25,000 | 97 | 59 |
| | 32 | 90 | 12 | 13 | 27,500 | 97 | 59 |
| | 33 | 90 | 12 | 13 | 12,000 | 84 | 59 |
| | 34 | 90 | 12 | 13 | 12,000 | 85 | 59 |
| | 35 | 90 | 12 | 12 | 12,000 | 100 | 59 |

TABLE 2-continued

Characteristics of urethane resin

| | Neutralization ratio of the whole acid group (%) | Acid value at molecular terminal (mgKOH/g) | Rate of urethane bond based on monoalcohol (%) | Weight-average molecular weight | Rate of urethane bond (%) | Acid value (mgKOH/g) |
|---|---|---|---|---|---|---|
| 36 | 90 | 12 | 13 | 12,000 | 97 | 59 |
| 37 | 90 | 12 | 13 | 12,000 | 97 | 59 |
| 38 | 90 | 12 | 13 | 12,000 | 97 | 59 |
| 39 | 90 | 12 | 13 | 12,000 | 97 | 59 |
| 40 | 90 | 12 | 13 | 12,000 | 97 | 59 |
| 41 | 90 | 12 | 13 | 12,000 | 97 | 59 |
| 42 | 90 | 12 | 13 | 12,000 | 97 | 59 |
| 43 | 79 | 12 | 13 | 12,000 | 97 | 59 |
| 44 | 80 | 12 | 13 | 12,000 | 97 | 59 |
| 45 | 90 | 12 | 9 | 3,600 | 84 | 59 |
| 46 | 90 | 12 | 13 | 12,000 | 97 | 60 |
| 47 | 90 | 12 | 13 | 12,000 | 97 | 59 |
| 48 | 90 | 12 | 13 | 12,000 | 97 | 58 |
| 49 | 90 | 22 | 10 | 12,000 | 97 | 59 |
| 50 | 90 | 12 | 4 | 12,000 | 97 | 60 |
| 51 | 90 | 12 | 22 | 12,000 | 97 | 59 |
| 52 | 90 | 0 | 0 | 7,800 | 100 | 35 |
| 53 | 90 | 0 | 0 | 102,000 | 100 | 74 |
| 54 | 90 | 21 | 0 | 50,000 | 95 | 60 |
| 55 | 90 | 0 | 24 | 12,000 | 100 | 46 |
| 56 | 90 | 80 | 0 | 15,000 | 100 | 100 |

Preparation of Pigment Dispersion
Pigment Dispersion 1

A pigment (carbon black, 10.0 g), a water-soluble resin (20.0 g) and water (70.0 g) were mixed to prepare a mixture. The water-soluble resin used was prepared by neutralizing a styrene-acrylic acid copolymer having an acid value of 200 mgKOH/g and a weight-average molecular weight of 10,000 with a 10.0% aqueous sodium hydroxide solution. This mixture was dispersed with a sand grinder for 1 hour and was then centrifuged to remove impurities and was further pressure filtered through a microfilter (manufactured by Fujifilm Corporation) having a pore size of 3.0 μm. Subsequently, the concentration of the pigment solid content was adjusted to give Figment dispersion 1 having a pH of 10.0. Pigment dispersion 1 contained a pigment dispersed in a water-soluble resin (resin dispersant), and the contents of the pigment and the resin were 30.0% and 15.0%, respectively.

Pigment Dispersion 2

Carbon black (10.0 g), a liquid (66.7 g) containing urethane resin 1 and water (23.3 g) were mixed to prepare a mixture. This mixture was dispersed with a sand grinder for 1 hour and was then centrifuged to remove impurities and was further pressure filtered through a microfilter (manufactured by Fujifilm Corporation) having a pore size of 3.0 μm. Subsequently, the concentration of the pigment solid content was adjusted to give Pigment dispersion 2 having a pH of 10.0. Pigment dispersion 2 contained a pigment dispersed in urethane resin 1, and the contents of the pigment and the resin were 30.0% and 15.0%, respectively.

Pigment Dispersion 3

Carbon black (20.0 g), ((4-aminobenzoylamino)-methane-1,1-diyl)bisphosphonic acid monosodium salt (7.0 mmol), nitric acid (20.0 mmol) and pure water (200.0 mL) were mixed. The mixture was mixed with a Silverson mixer at 6,000 rpm at room temperature. After 30 minutes, 20.0 mmol of sodium nitrite dissolved in a small amount of water was gradually added to the mixture. The temperature of the mixture reached 60° C. by this mixing, and the reaction was continued for 1 hour in this state. The pH of the mixture was then adjusted to 10 with an aqueous sodium hydroxide solution. After 30 minutes, 20.0 mL of pure water was added to the mixture, followed by diafiltration through spectrum membrane. The counter ion of the anionic group of the self-dispersible pigment was exchanged from a sodium ion to a potassium by an ion exchange process. The concentration of the pigment solid content was then adjusted to give Pigment dispersion 3. Pigment dispersion 3 contained a self-dispersible pigment having a —$C_6H_4$—CONH—CH$(PO(OK)_2)_2$ group bonded to the particle surface, and the content of the pigment was 30.0%.

Pigment Dispersion 4

4-Amino-1,2-benzenedicarboxylic acid (1.5 g) cooled to 5° C. was added to a solution of 5.0 g of concentrated hydrochloric acid dissolved in 5.5 g of water. The container containing this solution was placed in an ice bath, and the solution was maintained at 10° C. or less by being stirred. To this solution was added a solution of 1.8 g of sodium nitrite dissolved in 9.0 g of water of 5° C. The resulting solution was further stirred for 15 minutes, and 6.0 g of carbon black was then added thereto with stirring, followed by further stirring for 15 minutes to give a slurry. The resulting slurry was filtered through filter paper (trade name: Standard Filter Paper No. 2", manufactured by Advantec Co., Ltd.), and pigment particles were then sufficiently washed with water, followed by drying with an oven of 110° C. to prepare a self-dispersible pigment. The counter ion of the anionic group of the self-dispersible pigment was exchanged from a sodium ion to a potassium ion by an ion exchange process. The concentration of the pigment solid content was then adjusted to give Pigment dispersion 4. Pigment dispersion 4 contained a self-dispersible pigment having a —$C_6H_6$—$(COOK)_2$ group bonded to the particle surface, and the content of the pigment was 30.0%.

Pigment Dispersion 5

Ion-exchanged water (500.0 g) and carbon black (15.0 g) were stirred at 15,000 rpm for 30 minutes to preliminarily wet the pigment, and ion-exchanged water (4,485 g) was added to the mixture, followed by dispersion with a high-pressure homogenizer to give a dispersion A. The pigment in this dispersion A had an average particle diameter of 110 nm.

The resulting dispersion A was transferred to a pressurized container and was pressurized at a pressure of 3.0 MPa. Ozone water having an ozone concentration of 100 ppm was then introduced into the dispersion A for ozone oxidation of the pigment to prepare a dispersion B. The pH of the dispersion B was adjusted to 10.0 with potassium hydroxide, and the concentration of the pigment solid content was then adjusted to give Pigment Dispersion 5. Pigment Dispersion 5 contained a self-dispersible pigment having a —COOK group bonded to the particle surface, and the content of the pigment was 30.0%.

Pigment Dispersion 6

Carbon black (500.0 g), aminophenyl(2-sulfoethyl)sulfone (APSES, 45.0 g) and distilled water (900.0 g) were put in a reactor and were stirred at 55° C. and a rotation speed of 300 rpm for 20 minutes. A 25.0% aqueous sodium nitrite solution (40.0 g) was dropwise added to the mixture over 15 minutes, and distilled water (50.0 g) was then added thereto. A reaction at 60° C. for 2 hours gave a reaction product. The resulting reaction product was extracted while diluting with distilled water, and the concentration of the pigment solid content was adjusted to give a dispersion having a pigment amount of 15.0%. Subsequently, impurities were removed by centrifugation to give a dispersion C. This dispersion C contained a pigment having APSES bonded to the particle surface of the pigment.

In order to determine the molar number of the functional group bonded to the pigment in the dispersion C, the following operation was performed. The concentration of sodium ion in the dispersion C was measured with a sodium ion electrode (1512A-10C, manufactured by Horiba, Ltd.) and was converted to the molar number (mol/g) per pigment solid content. Subsequently, the dispersion C having a pigment amount of 15.0% was dropwise added to a pentaethylenehexamine (PEHA) solution at room temperature over 1 hour with vigorously stirring to give a mixture. On this occasion, the concentration of PEHA in the PEHA solution was adjusted to 1- to 10-fold the molar number of the sodium ion measured above, and the volume of the solution was adjusted to the same as that of the dispersion C. This mixture was stirred for 18 to 48 hours, and impurities were then removed to give a dispersion D. The dispersion D contained a pigment having PEHA bonded to the particle surface through APSES, and the content of the pigment was 10.0%.

As a water-soluble resin, a styrene-acrylic acid copolymer (weight-average molecular weight: 8,000, acid value: 140 mgKOH/g, degree of dispersion Mw/Mn: 1.5 (Mw: weight-average molecular weight, Mn: number-average molecular weight)) was prepared. This water-soluble resin (190.0 g) was added to distilled water (1,800 g), and potassium hydroxide in an amount necessary for neutralizing the resin was added thereto and was dissolved therein by stirring to give a resin aqueous solution. The dispersion D (500.0 g) having a pigment amount of 10.0% was dropwise added to the resulting resin aqueous solution to give a mixture. The mixture was transferred to an evaporating dish and was heated at 150° C. for 15 hours to evaporate the liquid components, followed by cooling of the dry matter to room temperature. The dry matter was then added to a distilled water having a pH of 9.0 adjusted with potassium hydroxide, followed by dispersion with a disperser. A 1.0 mol/L aqueous potassium hydroxide solution was further added to the dispersion with stirring, and the pH of the solution was adjusted to 10 to 11. Subsequently, impurities and coarse particles were removed by demineralization and purification to give Pigment dispersion 6. Pigment dispersion 6 contained a resin-bonded self-dispersible pigment having an organic group including a polymer (styrene-acrylic acid copolymer, which is a water-soluble resin) bonded to the particle surface. The amount of the pigment content was 30.0%, and the amount of the resin content was 15.0%.

Pigment Dispersion 7

Pigment dispersion 7 was prepared as in Pigment dispersion 1 except that the pigment was changed to C.I. Pigment Blue 15:3 (manufactured by Clariant). Pigment dispersion 7 contained a pigment dispersed in a water-soluble resin (resin dispersant), and the content of the pigment was 30.0%, and the content of the resin was 15.0%.

Pigment Dispersion 8

Pigment dispersion 8 was prepared as in Pigment dispersion 1 except that the pigment was changed to C.I. Pigment Red 122 (manufactured by Clariant). The Pigment dispersion 8 contained a pigment dispersed in a water-soluble resin (resin dispersant), and the content of the pigment was 30.0%, and the content of the resin was 15.0%.

Pigment Dispersion 9

Pigment dispersion 9 was prepared as in Pigment dispersion 1 except that the pigment was changed to C.I. Pigment. Yellow 74 (manufactured by Clariant). The Figment dispersion 9 contained a pigment dispersed in a water-soluble resin (resin dispersant), and the content of the pigment was 30.0%, and the content of the resin was 15.0%.

Preparation of Ink

The following components:
Pigment dispersion (shown in Table 3 or 4): 10.0%,
Liquid containing urethane resin (shown in Table 3 or 4): the amount (%) shown in Table 3 or 4,
Glycerin: 9.0%,
Triethylene glycol: 5.0%,
Acetylenol E100: 0.1%, and
Ion-exchanged water: remainder were mixed and sufficiently stirred, followed by pressure filtration through a microfilter (manufactured by Fujifilm Corporation) having a pore size of 3.0 μm to prepare each ink. Acetylenol E100 is a nonionic surfactant (acetylene glycol ethylene oxide adduct) manufactured by Kawaken Fine Chemicals Co., Ltd. The remainder of ion-exchanged water is the amount making the total amount of all the components of the ink 100.0%.

Evaluation

Ink cartridges were filled with the inks prepared above and were mounted on an ink jet recording apparatus (trade name: "PIXUS Pro9500", manufactured by CANON KABUSHIKI KAISHA), which ejects an ink from the recording head by means of thermal energy. The ejection volume of one droplet of an ink in the recording apparatus was within 3.5 ng±10%. The recording conditions were a temperature of 23° C. and a relative humidity of 55%. In the present invention, in the evaluation criteria of each evaluation item shown below, A and B were regarded as acceptable levels, and C was regarded as an unacceptable level. The results of the evaluations are shown in Tables 3 and 4. Tables 3 and 4 also show the characteristics of each ink.

Glossiness

A solid image was recorded with the ink jet recording apparatus on glossy paper (trade name: "Canon Photographic Paper-Gloss Pro PT-201", manufactured by CANON KABUSHIKI KAISHA) by applying 6 droplets (about 22 ng) of an ink for a unit region of 1/600 by 1/600 inches to give a recorded matter. After one day from the recording, the 20° gloss of the solid image was measured with a digital haze meter (trade name: "Micro-haze plus", manufactured by BYK Gardner), and the glossiness was evaluated in accordance with the following evaluation criteria:
A: a 20° gloss of 40 or more,
B: a 20° gloss of 30 or more to less than 40, and
C: a 20° gloss of less than 30.

Image Clarity

A solid image was recorded with the ink jet recording apparatus on glossy paper (trade name: "Canon Photographic Paper-Gloss Pro PT-201", manufactured by CANON KABUSHIKI KAISHA) by applying 8 droplets (about 30 ng) of an ink for a unit region of 1/600 by 1/600 inches to give a recorded matter. Two fluorescent lamps disposed with an interval of 10 cm were used as the light source for observation of the solid image. The fluorescent lamps were projected on the solid image from a position apart by 2 m. The shapes of the fluorescent lamps projected on the solid image were visually observed at an illumination angle of 45 degrees and an observation angle of 45 degrees, and the image clarity was evaluated in accordance with the following evaluation criteria:
A: no blur was observed at the edge portions of the projected two fluorescent lamps,
B: slight blurs were observed at the edge portions of the projected two fluorescent lamps, and
C: the boundary between the projected two fluorescent lamps was not recognized.

Color Developability

A solid image was recorded with the ink jet recording apparatus on each of two types of plain paper by applying 6 droplets (about 22 ng) of an ink for a unit region of 1/600 by 1/600 inches to give a recorded matter. The plain paper used was "PB PAPER" (trade name, manufactured by CANON KABUSHIKI KAISHA) and "Bright White Inkjet Paper" (trade name, manufactured by Hewlett-Packard Company). After one day from the recording, the optical densities of the solid images on the two types of plain paper were measured with a reflection densitometry (trade name: "Macbeth RD-918", manufactured by Macbeth), and the color developability was evaluated from the average of the optical densities in accordance with the following evaluation criteria, where the evaluation criteria shown in parentheses are applied to an ink containing a pigment other than carbo black:

A: an average optical density of 1.3 or more (0.8 or more),
B: an average optical density of 1.2 or more to less than 1.3 (0.7 or more to less than 0.8), and
C: an average optical density of less than 1.2 (less than 0.7).

Intermittent Ejection Stability

Ink cartridges were filled with the inks prepared above and were mounted on an ink jet recording apparatus (trade name: "PIXUS iP3100", manufactured by CANON KABUSHIKI KAISHA), which ejects an ink from the recording head by means of thermal energy. The ejection volume of one droplet of an ink in the recording apparatus was within 28 ng±10%. In the environment of a temperature of 15° C.±2° C. and a relative humidity of 10%, 10,000 droplets of each ink were ejected from all the ejection orifices of the recording head at a drive frequency of 5 kHz. Subsequently, a blank of 0.5 inches was provided, and the ink was then ejected from one ejection orifice to record a horizontal ruled line having a width of four dots (four droplets of the ink). Ejection of the ink was then paused for 1.5 seconds, and the ink was then ejected from the same one ejection orifice to record a horizontal ruled line having a width of four dots again. The conditions of the two horizontal ruled lines thus-recorded before and after the pause of ejection for 1.5 seconds were visually observed, and the intermittent ejection stability was evaluated in accordance with the following evaluation criteria:
AA: no quality deterioration was observed in the horizontal ruled line after the pause of ejection, and the line widths of the two horizontal ruled lines before and after the pause of ejection were equal to each other,
A: the horizontal ruled line after the pause of ejection had quality deterioration, but the line widths of the two horizontal ruled lines before and after the pause of ejection were equal to each other,
B: the horizontal ruled line after the pause of ejection had quality deterioration, and the line width of the horizontal ruled line after the pause of ejection was smaller than that before the pause of ejection, and
C: the horizontal ruled line after the pause of ejection had quality deterioration, and the line width of the horizontal ruled line after the pause of ejection was significantly smaller than that before the pause of ejection.

TABLE 3

Composition and characteristics of in and evaluation results

| | | Composition and characteristics of ink | | | | | Evaluation results | | | |
|---|---|---|---|---|---|---|---|---|---|---|
| | | Liquid containing | | Content in ink | | Mass | | | | Intermittent |
| | No. of Pigment dispersion | No. of urethane resin | Amount (%) | Pigment A (%) | Urethane resin B (%) | ratio A/B | Glossiness | Image clarity | Color developability | ejection stability |
| Example 1 | 1 | 1 | 5.0 | 3.0 | 1.5 | 0.5 | A | A | A | AA |
| 2 | 2 | 1 | 5.0 | 3.0 | 1.5 | 0.5 | A | A | A | AA |
| 3 | 3 | 1 | 5.0 | 3.0 | 1.5 | 0.5 | A | A | A | AA |
| 4 | 4 | 1 | 5.0 | 3.0 | 1.5 | 0.5 | A | A | A | AA |
| 5 | 5 | 1 | 5.0 | 3.0 | 1.5 | 0.5 | A | A | A | AA |
| 6 | 6 | 1 | 5.0 | 3.0 | 1.5 | 0.5 | A | A | A | AA |
| 7 | 7 | 1 | 5.0 | 3.0 | 1.5 | 0.5 | A | A | A | AA |
| 8 | 8 | 1 | 5.0 | 3.0 | 1.5 | 0.5 | A | A | A | AA |
| 9 | 9 | 1 | 5.0 | 3.0 | 1.5 | 0.5 | A | A | A | AA |
| 10 | 1 | 2 | 5.0 | 3.0 | 1.5 | 0.5 | A | A | A | AA |
| 11 | 1 | 3 | 5.0 | 3.0 | 1.5 | 0.5 | A | A | A | AA |
| 12 | 1 | 4 | 5.0 | 3.0 | 1.5 | 0.5 | A | A | A | AA |
| 13 | 1 | 5 | 5.0 | 3.0 | 1.5 | 0.5 | A | A | A | AA |
| 14 | 1 | 6 | 5.0 | 3.0 | 1.5 | 0.5 | B | A | A | AA |

TABLE 3-continued

Composition and characteristics of in and evaluation results

| | No. of Pigment dispersion | No. of urethane resin | Amount (%) | Pigment A (%) | Urethane resin B (%) | Mass ratio A/B | Glossiness | Image clarity | Color developability | Intermittent ejection stability |
|---|---|---|---|---|---|---|---|---|---|---|
| 15 | 1 | 7 | 5.0 | 3.0 | 1.5 | 0.5 | B | A | A | AA |
| 16 | 1 | 8 | 5.0 | 3.0 | 1.5 | 0.5 | B | A | A | AA |
| 17 | 1 | 9 | 5.0 | 3.0 | 1.5 | 0.5 | B | A | A | AA |
| 18 | 1 | 10 | 5.0 | 3.0 | 1.5 | 0.5 | B | A | A | AA |
| 19 | 1 | 11 | 5.0 | 3.0 | 1.5 | 0.5 | A | A | A | AA |
| 20 | 1 | 12 | 5.0 | 3.0 | 1.5 | 0.5 | A | A | A | AA |
| 21 | 1 | 13 | 5.0 | 3.0 | 1.5 | 0.5 | A | A | A | AA |
| 22 | 1 | 14 | 5.0 | 3.0 | 1.5 | 0.5 | A | A | A | AA |
| 23 | 1 | 15 | 5.0 | 3.0 | 1.5 | 0.5 | B | A | A | AA |
| 24 | 1 | 16 | 5.0 | 3.0 | 1.5 | 0.5 | B | A | A | AA |
| 25 | 1 | 17 | 5.0 | 3.0 | 1.5 | 0.5 | B | A | A | AA |
| 26 | 1 | 18 | 5.0 | 3.0 | 1.5 | 0.5 | B | A | A | AA |
| 27 | 1 | 19 | 5.0 | 3.0 | 1.5 | 0.5 | A | A | A | AA |
| 28 | 1 | 20 | 5.0 | 3.0 | 1.5 | 0.5 | A | A | A | AA |
| 29 | 1 | 21 | 5.0 | 3.0 | 1.5 | 0.5 | A | A | A | AA |
| 30 | 1 | 22 | 5.0 | 3.0 | 1.5 | 0.5 | A | A | A | AA |
| 31 | 1 | 23 | 5.0 | 3.0 | 1.5 | 0.5 | A | B | A | AA |
| 32 | 1 | 24 | 5.0 | 3.0 | 1.5 | 0.5 | A | B | A | AA |
| 33 | 1 | 25 | 5.0 | 3.0 | 1.5 | 0.5 | A | A | A | AA |
| 34 | 1 | 26 | 5.0 | 3.0 | 1.5 | 0.5 | A | A | A | AA |
| 35 | 1 | 27 | 5.0 | 3.0 | 1.5 | 0.5 | B | A | A | AA |
| 36 | 1 | 28 | 5.0 | 3.0 | 1.5 | 0.5 | B | A | A | AA |
| 37 | 1 | 29 | 5.0 | 3.0 | 1.5 | 0.5 | B | A | A | AA |
| 38 | 1 | 30 | 5.0 | 3.0 | 1.5 | 0.5 | A | A | A | AA |
| 39 | 1 | 31 | 5.0 | 3.0 | 1.5 | 0.5 | A | A | A | AA |
| 40 | 1 | 32 | 5.0 | 3.0 | 1.5 | 0.5 | B | A | A | AA |
| 41 | 1 | 33 | 5.0 | 3.0 | 1.5 | 0.5 | B | B | A | AA |
| 42 | 1 | 34 | 5.0 | 3.0 | 1.5 | 0.5 | A | A | A | AA |
| 43 | 1 | 35 | 5.0 | 3.0 | 1.5 | 0.5 | A | A | A | AA |
| 44 | 1 | 36 | 5.0 | 3.0 | 1.5 | 0.5 | A | A | A | B |
| 45 | 1 | 37 | 5.0 | 3.0 | 1.5 | 0.5 | A | A | A | AA |
| 46 | 1 | 38 | 5.0 | 3.0 | 1.5 | 0.5 | B | A | A | AA |
| 47 | 1 | 39 | 5.0 | 3.0 | 1.5 | 0.5 | A | A | A | AA |
| 48 | 1 | 40 | 5.0 | 3.0 | 1.5 | 0.5 | A | A | A | AA |
| 49 | 1 | 41 | 5.0 | 3.0 | 1.5 | 0.5 | A | A | A | A |
| 50 | 1 | 42 | 5.0 | 3.0 | 1.5 | 0.5 | A | A | A | B |
| 51 | 1 | 43 | 5.0 | 3.0 | 1.5 | 0.5 | A | A | A | A |
| 52 | 1 | 44 | 5.0 | 3.0 | 1.5 | 0.5 | A | A | A | AA |
| 53 | 1 | 1 | 0.4 | 3.0 | 0.12 | 0.04 | A | A | B | AA |
| 54 | 1 | 1 | 0.5 | 3.0 | 0.15 | 0.05 | A | A | A | AA |
| 55 | 1 | 1 | 20.0 | 3.0 | 6.0 | 2.0 | A | A | A | AA |
| 56 | 1 | 1 | 22.0 | 3.0 | 6.6 | 2.2 | B | B | A | AA |
| 57 | 1 | 45 | 0.4 | 3.0 | 0.12 | 0.04 | B | B | B | B |

TABLE 4

Composition and characteristics of ink and Evaluation results

| | | No. of Pigment dispersion | No. of urethane resin | Amount (%) | Pigment A (%) | Urethane resin B (%) | Mass ratio A/B | Glossiness | Image clarity | Color developability | Intermittent ejection stability |
|---|---|---|---|---|---|---|---|---|---|---|---|
| Comparative Example | 1 | 1 | — | 0.0 | 3.0 | 0.0 | 0.0 | C | C | A | AA |
| | 2 | 1 | 46 | 5.0 | 3.0 | 1.5 | 0.5 | C | C | A | AA |
| | 3 | 1 | 47 | 5.0 | 3.0 | 1.5 | 0.5 | C | C | A | AA |
| | 4 | 1 | 48 | 5.0 | 3.0 | 1.5 | 0.5 | C | C | A | AA |
| | 5 | 1 | 49 | 5.0 | 3.0 | 1.5 | 0.5 | A | A | C | AA |
| | 6 | 1 | 50 | 5.0 | 3.0 | 1.5 | 0.5 | A | C | A | AA |
| | 7 | 1 | 51 | 5.0 | 3.0 | 1.5 | 0.5 | C | A | A | AA |

TABLE 4-continued

Composition and characteristics of ink and Evaluation results

| | No. of Pigment dispersion | Liquid containing urethane resin No. of urethane resin | Liquid containing urethane resin Amount (%) | Content in ink Pigment A (%) | Content in ink Urethane resin B (%) | Mass ratio A/B | Evaluation results Glossiness | Evaluation results Image clarity | Evaluation results Color developability | Evaluation results Intermittent ejection stability |
|---|---|---|---|---|---|---|---|---|---|---|
| | 8 | 1 | 52 | 5.0 | 3.0 | 1.5 | 0.5 | C | C | A | AA |
| | 9 | 1 | 53 | 5.0 | 3.0 | 1.5 | 0.5 | C | C | A | AA |
| Reference Example | 1 | 1 | 54 | 5.0 | 3.0 | 1.5 | 0.5 | C | C | A | AA |
| | 2 | 1 | 55 | 5.0 | 3.0 | 1.5 | 0.5 | C | A | A | AA |
| | 3 | 1 | 56 | 5.0 | 3.0 | 1.5 | 0.5 | C | C | A | AA |

The present invention can provide an aqueous ink that can record images having excellent glossiness, image clarity and color developability and an ink cartridge and an ink jet recording method using the aqueous ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-252826 filed Dec. 27, 2016 and Japanese Patent Application No. 2017-171452 filed Sep. 6, 2017, which are hereby incorporated by reference herein in its entirety.

What is claimed is:

1. An aqueous ink, for ink jet recording, comprising a pigment and a urethane resin, wherein
   the urethane resin includes units respectively derived from a polyisocyanate, a polyol having no acid group, a polyol having acid group and a primary monoalcohol;
   the urethane resin has an acid value of 20 mgKOH/g or less based on the unit present at a molecular terminal of the urethane resin and derived from the polyol having acid group;
   a rate (mol %) of the urethane bond formed by units derived from the polyisocyanate and the primary monoalcohol accounting for the total of the urethane bond and a urea bond in the urethane resin is 10 mol % or more to 15 mol % or less, and
   the rate (mol %) of the unit derived from the primary monoalcohol is 10.0 mol % or more to 30.0 mol % or less in the urethane resin.

2. The aqueous ink according to claim 1, wherein the polyol having no acid group includes a polyether polyol.

3. The aqueous ink according to claim 1, wherein the urethane resin has a weight-average molecular weight range of 4,000 or more to 25,000 or less.

4. The aqueous ink according to claim 1, wherein a rate range (mol %) of the urethane bond accounting for the total of the urethane bond and the urea bond in the urethane resin is 85 mol % or more to 100 mol % or less.

5. The aqueous ink according to claim 1, wherein the acid group in the urethane resin is neutralized with an alkali metal ion and at least one ammonium type ion selected from an ammonium ion and an organic ammonium ion, and the total neutralization ratio range of the acid group in the urethane resin is 80% or more, and the neutralization ratio range by the ammonium type ion is 1% or more to less than 45%.

6. The aqueous ink according to claim 1, wherein the mass ratio range of the content (mass %) of the urethane resin based on the total mass of the ink to the content (mass %) of the pigment based on the total mass of the ink is 0.05 times or more to 2.00 times or less.

7. An ink cartridge comprising an ink and an ink storage portion storing the ink, wherein the ink comprises an aqueous ink according to claim 1.

8. An ink jet recording method for recording an image on a recording medium by ejecting an ink from a recording head of an ink jet system, wherein the ink comprises an aqueous ink according to claim 1.

9. The aqueous ink according to claim 1, wherein the polyisocyanate includes a diisocyanate.

10. The aqueous ink according to claim 1, wherein the polyol having acid group includes a polyol having a carboxylic acid group.

11. The aqueous ink according to claim 1, wherein the primary monoalcohol includes a primary monoalcohol having 1 to 6 carbon atom(s).

12. The aqueous ink according to claim 1, wherein the urethane resin has an acid value of 15 mgKOH/g or less based on the unit present at a molecular terminal of the urethane resin and derived from the polyol having acid group.

13. The aqueous ink according to claim 1, wherein the urethane resin has an acid value of 0 mgKOH/g or more based on the unit present at a molecular terminal of the urethane resin and derived from the polyol having acid group.

14. The aqueous ink according to claim 1, wherein the urethane resin has an acid value of 5 mgKOH/g or less based on the unit present at a molecular terminal of the urethane resin and derived from the polyol having acid group.

15. The aqueous ink according to claim 1, wherein the urethane resin has an acid value of 40 mgKOH/g or more to 140 mgKOH/g or less.

16. The aqueous ink according to claim 1, wherein the urethane resin further includes an unit derived from a polyamine.

17. The aqueous ink according to claim 1, wherein the rate (mol %) of the unit derived from the polyisocyanate is 10.0 mol % or more to 80.0 mol % or less in the urethane resin.

18. The aqueous ink according to claim 17, wherein the rate (mol %) of the unit derived from the polyol and the polyamine is 10.0 mol % or more to 80.0 mol % or less in the urethane resin.

19. An aqueous ink, for ink jet recording, comprising a pigment and a urethane resin, wherein the urethane resin includes units respectively derived from a polyisocyanate, a polyol having no acid group, a polyol having acid group and a primary monoalcohol;

the urethane resin has an acid value of 20 mgKOH/g or less based on the unit present at a molecular terminal of the urethane resin and derived from the polyol having acid group;

a rate (mol %) of the urethane bond formed by units derived from the polyisocyanate and the primary monoalcohol accounting for the total of the urethane bond and a urea bond in the urethane resin is 10 mol % or more to 15 mol % or less, and the urethane resin further includes an unit derived from a polyamine.

* * * * *